(12) United States Patent
Ouchiyama et al.

(10) Patent No.: US 9,187,641 B2
(45) Date of Patent: Nov. 17, 2015

(54) POLYPHENYLENE SULFIDE RESIN COMPOSITION, MOLDED PRODUCT OF POLYPHENYLENE SULFIDE RESIN COMPOSITION AND PRODUCTION METHOD OF POLYPHENYLENE SULFIDE RESIN COMPOSITION

(71) Applicant: TORAY INDUSTRIES, INC., Tokyo (JP)

(72) Inventors: Naoya Ouchiyama, Nagoya (JP); Shunsuke Horiuchi, Nagoya (JP); Hideki Matsumoto, Nagoya (JP); Kei Saitoh, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 14/364,880

(22) PCT Filed: Dec. 26, 2012

(86) PCT No.: PCT/JP2012/008306
§ 371 (c)(1),
(2) Date: Jun. 12, 2014

(87) PCT Pub. No.: WO2013/099234
PCT Pub. Date: Jul. 4, 2013

(65) Prior Publication Data
US 2014/0343215 A1 Nov. 20, 2014

(30) Foreign Application Priority Data

Dec. 28, 2011 (JP) ................................. 2011-287785
Jan. 27, 2012 (JP) ................................. 2012-14944
Jan. 30, 2012 (JP) ................................. 2012-16844
Sep. 26, 2012 (JP) ................................. 2012-212225
Sep. 26, 2012 (JP) ................................. 2012-212226

(51) Int. Cl.
*C08L 81/00* (2006.01)
*C08L 81/04* (2006.01)
*C08L 81/02* (2006.01)
*B29K 81/00* (2006.01)
*B29C 45/00* (2006.01)

(52) U.S. Cl.
CPC ............. *C08L 81/02* (2013.01); *B29C 45/0001* (2013.01); *B29K 2081/04* (2013.01); *C08L 2205/025* (2013.01)

(58) Field of Classification Search
CPC .......................... C08L 81/04; C08L 2205/025
See application file for complete search history.

(56) References Cited

U.S. PATENT DOCUMENTS

| 5,384,391 | A | 1/1995 | Miyata et al. |
| 2009/0234068 | A1 | 9/2009 | Horiuchi et al. |
| 2010/0068518 | A1* | 3/2010 | Honma et al. ............... 428/401 |

FOREIGN PATENT DOCUMENTS

| EP | 1 630 201 A1 | 3/2006 |
| JP | 5-163349 A | 6/1993 |
| JP | 6-172530 A | 6/1994 |
| JP | 7-53865 A | 2/1995 |
| JP | 2001-98151 A | 4/2001 |
| JP | 2005-171242 A | 6/2005 |
| JP | 2006-219666 A | 8/2006 |
| JP | 2008-222889 A | 9/2008 |
| JP | 2008-222899 A | 9/2008 |
| JP | 2008-231141 A | 10/2008 |
| JP | 2009-30030 A | 2/2009 |
| JP | 2011-195824 A | 10/2011 |
| WO | WO 2007/034800 A1 | 3/2007 |

OTHER PUBLICATIONS

Search Report dated Nov. 13, 2014 for European Application No. 12863993.7.
International Search Report issued in PCT/JP2012/008306, mailed on Apr. 9, 2013.

* cited by examiner

*Primary Examiner* — Ana Woodward
(74) *Attorney, Agent, or Firm* — Birch, Stewart, Kolasch & Birch, LLP

(57) ABSTRACT

There is provided a polyphenylene sulfide resin composition, comprising 5 to 95% by weight of a component (B) which is a polyphenylene sulfide resin having a weight-average molecular weight of not less than 10,000 and a weight loss percentage $\Delta Wr$ of not greater than 0.18% under heating, relative to 95 to 5% by weight of a component (A) which is a polyphenylene sulfide resin having the weight loss percentage $\Delta Wr$ of greater than 0.18%, wherein a total of the component (A) and the component (B) is equal to 100% by weight.

6 Claims, No Drawings

POLYPHENYLENE SULFIDE RESIN COMPOSITION, MOLDED PRODUCT OF POLYPHENYLENE SULFIDE RESIN COMPOSITION AND PRODUCTION METHOD OF POLYPHENYLENE SULFIDE RESIN COMPOSITION

TECHNICAL FIELD

The present invention relates to a polyphenylene sulfide resin composition having significantly improved heat resistance and reduced outgas amount without deteriorating the intrinsic properties of polyphenylene sulfide resin, a molded product thereof and a production method thereof.

BACKGROUND ART

The polyphenylene sulfide resin (hereinafter abbreviated as PPS resin) has a high molting point and has favorable properties as engineering plastic, for example, excellent flame resistance, rigidity and chemical resistance. The PPS resin is molded mainly by injection molding and is used in a wide range of applications including various electric and electronic components, mechanical components, automobile components and home electric appliances. The PPS resin material having the excellent heat resistance and the good flowability has been highly demanded to meet the latest needs for modularization of large components for automobiles and reduction of the wall thickness of molded products accompanied with weight reduction. The PPS resin alone, however, has the problem of insufficient rigidity at high temperatures by reduction of the wall thickness of the molded product. The PPS resin mixed with an inorganic filler such as glass fibers has, on the other hand, a significant increase in melt viscosity, while improving the heat resistance and the rigidity. This causes problems such as an increase in outgas amount by high shear heat generation during injection molding and deterioration of the molding processability.

In the development of the PPS resin to the application of automobile lighting components that need the excellent surface smoothness and rigidity, since the PPS resin alone has insufficient rigidity, the known technique mixes an inorganic filler with the PPS resin. This, however, fails to provide a molded product of the sufficient performance. Especially when a molded product is produced by mixing an inorganic filler with the PPS resin, the insufficient adhesiveness with the filler causes the uneven distribution of the filler on the surface of the molded product and the increased irregularities on the surface of the molded product. This fails to provide the sufficient surface smoothness and needs secondary processing such as undercoating for formation of the mirror surface by coating the molded product with a metal such as aluminum, thus undesirably reducing the mass productivity. Recently there has accordingly been high demand for the PPS resin material having the excellent surface smoothness and rigidity.

By taking advantage of its characteristics, the PPS resin has also been recently employed for plumbing components such as piping components in which oil passes through and home water heater piping components in which water passes through. The PPS resin alone, however, has not enough toughness that is important especially in plumbing components and is likely to cause a crack of piping by freezing. A technique of mixing an olefin resin with the PPS resin has been studied previously to prevent the freezing-induced cracking. The conventional technique of mixing an olefin resin improves the toughness but has the disadvantage that significant reduction of the rigidity at high temperature is likely to cause thermal deformation. A generally employed technique further mixes an inorganic filler, in order to solve the problem of the reduced rigidity at high temperatures by mixing the olefin resin. Mixing the inorganic filler improves the rigidity, but significantly deteriorates the toughness and additionally has the disadvantage of deterioration of the molding processability by an increase in melt viscosity. In order to solve such problems, there is a high demand for the PPS resin material satisfying both the toughness and the rigidity at the high level and having excellent molding processability.

For example, Patent Document 1 discloses a resin composition by mixing polyphenylene sulfide with a weight loss percentage $\Delta Wr$ of not greater than 0.18% under heating with fibrous and non-fibrous fillers. The resin composition described in Patent Document 1 has the reduced outgas amount and improvement in material rigidity but has the problem of the significantly reduced flowability. The resin composition described in Patent Document 1 additionally fails to sufficiently improve the adhesiveness with the filler and thereby fails to achieve the sufficient level of surface smoothness and rigidity.

Patent Document 2 discloses a PPS resin composition by mixing polyphenylene oxide as an amorphous resin and glass fibers having the fiber diameter of not greater than 7 μm. The PPS resin composition described in Patent Document 2 improves the molding shrinkage in the thickness direction by mixing the amorphous resin and has an effect of improvement on the surface smoothness to some extent. This, however, does not improve the adhesiveness with the filler and still causes the uneven distribution of the filler on the surface of the molded product, thus failing to provide the sufficient level of surface smoothness.

Patent Document 3 discloses a PPS resin composition by mixing a fibrous filler and a particulate filler in a specific shape. The resin composition described in Patent Document 3 tries to satisfy both the surface smoothness and the rigidity by combined use of the filler having the small particle diameter and the fibrous filler. This, however, fails to sufficiently improves the adhesiveness of the PPS resin with the filler and accordingly fails to provide the sufficient level of the surface smoothness of the PPS resin composition for the practical use.

Patent Document 4 discloses a PPS resin composition by mixing an ethylene-α-olefin copolymer having a glass transition temperature of not higher than −50° C. and an inorganic filler. The resin composition described in Patent Document 4 improves the rigidity by mixing the inorganic filler but has the problem of reduction in toughness at low temperatures. This resin composition is accordingly not the satisfactory level for the actual use.

The polyphenylene sulfide having the weight loss percentage $\Delta Wr$ of not greater than 0.18% is known by Patent Document 5. Patent Document 6 describes a resin composition by mixing an epoxy group-containing olefin copolymer and an olefin copolymer without containing epoxy group with such polyphenylene sulfide. The resin composition described in Patent Document 6 reduces the outgas amount and improves the molding processability but does not have sufficient compatibility of the PPS resin with the epoxy group-containing olefin resin, thus failing to provide the sufficient toughness.

Any of these patent documents fails to teach a composition by mixing different PPS resins having different weight lose percentages $\Delta Wr$ under heating and, as the result, a composition that solves the above problems of the PPS resin composition.

PRIOR ART DOCUMENTS

Patent Documents

Patent Document 1: JP 2008-231141A (Claims, Embodiments)
Patent Document 2: JP H07-53865A (Claims, Embodiments)
Patent Document 3: JP 2005-171242A (Claims, Embodiments)
Patent Document 4: JP 2011-195824A (Claims, Embodiments)
Patent Document 5: WO 2007-034800 (Claims, Embodiments)
Patent Document 6: JP 2008-222889A (Claims, Embodiments)

SUMMARY OF THE INVENTION

Problems to be Solved by the Invention

An object of the invention is to provide a polyphenylene sulfide resin composition having significantly improved heat resistance and reduced outgas amount without deteriorating the flowability and the mechanical properties which polyphenylene sulfide resin intrinsically has, by mixing polyphenylene sulfide resins having specific outgas amounts, as well as to provide a molded product thereof.

Means for Solving the Problems

The present invention is made to solve at least part of the problems described above and may be implemented by the following aspects.

1. There is provided a polyphenylene sulfide resin composition, comprising a component (A) and a component (B),
wherein the component (A) is a polyphenylene sulfide resin having a weight loss percentage $\Delta Wr$ expressed by Equation (1) of greater than 0.18% under heating:

$$\Delta Wr = (W1 - W2)/W1 \times 100\% \quad (1)$$

(wherein $\Delta Wr$ denotes weight loss percentage (%) and is a value determined from a sample weight (W2) at 330° C. based on a sample weight (W1) at 100° C. in thermogravimetric analysis from 50° C. to an arbitrary temperature of not lower than 330° C. at a temperature rise rate of 20° C./minute under ordinary-pressure, non-oxidizing atmosphere); and
the component (B) is a polyphenylene sulfide resin having a weight-average molecular weight of not less than 10,000 and having the weight loss percentage $\Delta Wr$ expressed by the Equation (1) of not greater than 0.18% under heating,
the polyphenylene sulfide resin composition comprising 5 to 95% by weight of the component (B) relative to 95 to 5% by weight of the component (A), wherein a total of the component (A) and the component (B) is equal to 100% by weight.

2. There is provided the polyphenylene sulfide resin composition described in Aspect 1, wherein the polyphenylene sulfide resin that is the component (B) has a degree of dispersion of not greater than 2.5, wherein the degree of dispersion is provided by dividing a weight-average molecular weight by a number-average molecular weight.

3. There is provided the polyphenylene sulfide resin composition described in either Aspect 1 or Aspect 2, further comprising: 1 to 500 parts by weight of a fibrous and/or non-fibrous filler (C) relative to 100 parts by weight of a total of the component (A) and the component (B).

4. There is provided the polyphenylene sulfide resin composition described in Aspect 3, further comprising: 0.05 to 10 parts by weight of an alkoxysilane compound (D) having one or more groups selected among epoxy group, amino group, isocyanate group, hydroxyl group, mercapto group and ureido group, relative to 100 parts by weight of a total of the component (A), the component (B) and the component (C).

5. There is provided the polyphenylene sulfide resin composition described in any of Aspects 1 to 4, further comprising: 1 to 70 parts by weight of a functional group-containing olefin copolymer (E) relative to 100 parts by weight of a total of the component (A) and the component (B).

6. There is provided the polyphenylene sulfide resin composition described in Aspect 5, wherein a functional group of the functional group-containing olefin copolymer (E) is one or more groups selected among epoxy group, carboxyl group, acid anhydride group, amino group and mercapto group.

7. There is provided the polyphenylene sulfide resin composition described in any of Aspects 1 to 6, wherein the component (B) has an alkali metal content of less than 700 ppm as a weight ratio.

8. There is provided the polyphenylene sulfide resin composition described in any of Aspects 1 to 7, wherein a content of a lactone-based compound in a gas component produced by heating the component (B) is not greater than 500 ppm on a weight basis of polyphenylene sulfide.

9. There is provided the polyphenylene sulfide resin composition described in any of Aspects 1 to 7, wherein a content of an aniline-based compound in a gas component produced by heating the component (B) is not greater than 300 ppm on a weight basis of polyphenylene sulfide resin.

10. There is provided the polyphenylene sulfide resin composition described in any of Aspects 1 to 9, wherein the component (B) is a polyphenylene sulfide resin which includes at least 50% by weight or more of a cyclic polyphenylene sulfide shown by a general formula (I):
[Chem. 1]

(I)

(wherein m is an integral number of 4 to 20, and the component (B) is allowed to be a mixture of a plurality of different cyclic polyphenylene sulfides having different numbers m) and is obtained by heating a polyphenylene sulfide prepolymer having a weight-average molecular weight of less than 10,000 to be converted to a high degree of polymer having a weight average molecular weight of not less than 10,000.

11. There is provided a molded product produced from the polyphenylene sulfide resin composition described in any of Aspects 1 to 10.

12. There is provided a production method of a polyphenylene sulfide resin composition, comprising the steps of:
providing a component (A) which is a polyphenylene sulfide resin having a weight loss percentage $\Delta Wr$ expressed by Equation (1) of greater than 0.18% under heating:

$$\Delta Wr = (W1 - W2)/W1 \times 100\% \quad (1)$$

(wherein $\Delta Wr$ denotes weight loss percentage (%) and is a value determined from a sample weight (W2) at 330° C. based on a sample weight (W1) at 100° C. in thermogravimetric analysis from 50° C. to an arbitrary temperature of not lower than 330° C. at a temperature rise rate of 20° C./minute under ordinary-pressure, non-oxidizing atmosphere);

providing a component (B) which is a polyphenylene sulfide resin having a weight-average molecular weight of not less than 10,000 and having the weight loss percentage ΔWr expressed by the Equation (1) of not greater than 0.18% under heating; and mixing 5 to 95% by weight of the component (B) with 95 to 5% by weight of the component (A), wherein a total of the component (A) and the component (B) is equal to 100% by weight.

Advantageous Effects of Invention

The invention provides a polyphenylene sulfide resin composition having excellent flowability, excellent heat resistance and reduced outgas amount by mixing a PPS resin having a weight loss percentage ΔWr of not greater than 0.18% under heating with a PPS resin having the weight loss percentage ΔWr of greater than 0.18% under heating. The polyphenylene sulfide resin composition of the invention satisfies both the flowability and the heat resistance at the high level and accordingly has excellent thin-wall moldability and thin-wall beat resistance, thus being useful for downsizing and weight saving of large components of automobiles. The invention provides a filler-reinforced polyphenylene sulfide resin composition having excellent surface smoothness, excellent rigidity and reduced outgas amount, by further adding 1 to 50 parts by weight of a fibrous and/or non-fibrous filler relative to the total of 100 parts by weight of the above two PPS resins. Mixing the filler with the polyphenylene sulfide resin composition of the invention satisfies both the surface smoothness and the rigidity at the high level and provides a PPS resin composition suitable for applications of various electric and electronic components, home electric appliances, automobile components and mechanical components and especially suitable as the material for applications of automobile lighting components that need the sophisticated appearance of a molded product and the high rigidity. The invention also provides a polyphenylene sulfide resin composition having improved rigidity and reduced outgas amount without significantly deteriorating high toughness by addition of an olefin-based resin, by further adding 1 to 70 parts by weight of a functional group-containing olefin copolymer relative to the total of 100 parts by weight of the above two PPS resins. Mixing the functional group-containing olefin-based resin with the polyphenylene sulfide resin composition of the invention satisfies both the toughness at low temperature and the rigidity at the high level and has reduced outgas amount. Accordingly this solves the problem of the reduced mass productivity due to the mold deposit and provides a PPS resin composition suitable as the material for plumbing components such as toilet-related components, water heater-related components, bath-related components and pump-related components.

MODE FOR CARRYING OUT THE INVENTION

The following describes embodiments of the invention in detail.
(A) Polyphenylene Sulfide Resin Having Weight Loss Percentage ΔWr of Greater than 0.18%

The polyphenylene sulfide resin (A) used according to an embodiment of the invention is a polymer having a repeating unit shown by the following structural formula:

[Chem. 2]

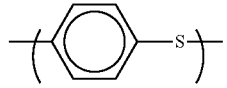

In terms of the heat resistance, the polyphenylene sulfide resin (A) is preferably a polymer having 70 mol % or more or further specifically having 90 mol % or more of the repeating unit shown by the above structural formula. The polyphenylene sulfide resin (A) may be configured, such that less than about 30 mol % of its repeating unit is comprised of, for example, repeating units having the following structures:

[Chem. 3]

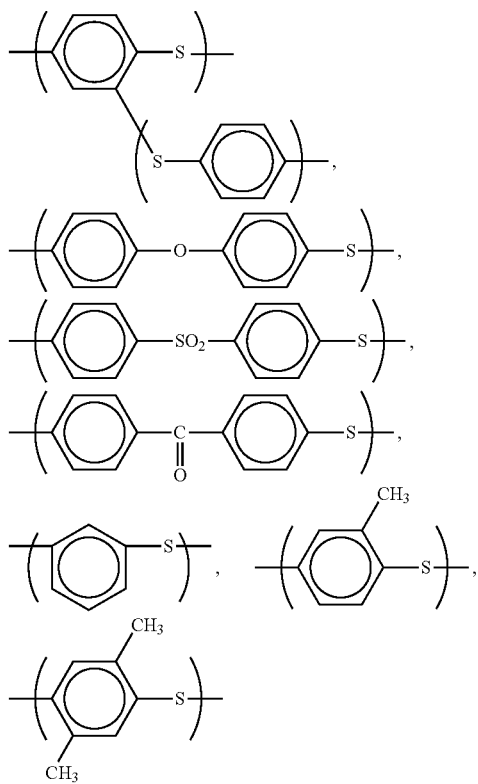

A polyphenylene sulfide copolymer partly including the above structures has a low melting point, so that a resin composition of this copolymer has an advantage in moldability.

The melt viscosity of the polyphenylene sulfide resin (A) used according to the embodiment of the invention is not specifically limited, but in terms of achieving the sufficient effect of improvement in heat resistance, is preferably not higher than 1000 Pa·s (300° C., shear rate: 1000/s), is more preferably not higher than 700 Pa·s and is furthermore preferably not higher than 500 Pa·s. The lower limit of the melt viscosity of the polyphenylene sulfide resin (A) is preferably not lower than 1 Pa·s in terms of the melt molding processability and the outgas amount. The melt viscosity according to the embodiment of the invention is a measured value using Capilograph manufactured by Toyo Seiki Seisaku-sho, Ltd. under the conditions of 300° C. and shear rate of 1000/s.

The molecular weight of the polyphenylene sulfide resin (A) according to the embodiment of the invention is not less than 10,000, is preferably not less than 15,000 and is more preferably not less than 18,000 as the weight-average molecular weight. The weight-average molecular weight of less than 10,000 reduces the moldability during processing and deteriorates the properties such as mechanical strength and heat resistance of a molded product. The upper limit of the weight-average molecular weight is not especially specified, but is preferably in a range of less than 1,000,000, more preferably less than 500,000 and furthermore preferably less than 200,000. The upper limit of the weight-average molecular weight in this range ensures the high molding processability.

The spread of the molecular weight distribution of the polyphenylene sulfide resin (A) according to the embodiment of the invention, i.e., the degree of dispersion shown by the ratio of the weight-average molecular weight to the number-average molecular weight (weight-average molecular weight/number-average molecular weight) is preferably not less than 2.5, is more preferably not less than 2.6, is furthermore preferably not less than 2.7 and is especially preferably not less than 3.0. The upper limit of the degree of dispersion is not especially specified, but a range of not greater than 5.0 is preferable. When the degree of dispersion exceeds 5.0, the polyphenylene sulfide resin (A) includes an extremely large amount of low-molecular components. This may cause deterioration of the mechanical properties and the melt residence stability in application of the polyphenylene sulfide resin (A) to molding process. The above weight-average molecular weight and number-average molecular weight may be determined, for example, by ESC (size exclusion chromatography) using a differential refractive index detector.

With regard to the polyphenylene sulfide resin (A) used according to the embodiment of the invention, a weight loss percentage under heating satisfies the following Expression (1):

$$\Delta Wr = (W1 - W2)/W1 \times 100 > 0.18 (\%) \tag{1}$$

Herein $\Delta Wr$ denotes weight loss percentage (%) and is a value determined from a sample weight (W2) at 330° C. based on a sample weight (W1) at 100° C. in thermogravimetric analysis from 50° C. to an arbitrary temperature of not lower than 330° C. at a temperature rise rate of 20° C./minute under ordinary-pressure, non-oxidizing atmosphere.

The lower limit of $\Delta Wr$ of the polyphenylene sulfide resin (A) used according to the embodiment of the invention is selected in a range of greater than 0.18%. The upper limit of $\Delta Wr$ of the polyphenylene sulfide resin (A) is preferably not greater than 0.40%, is more preferably not greater than 0.30% and is furthermore preferably not greater than 0.25%, in order to reduce the outgas amount during the molding process. When $\Delta Wr$ of the polyphenylene sulfide resin (A) used according to the embodiment of the invention exceeds 2.0%, the outgas amount during the molding process of a resin composition including the polyphenylene sulfide resin (A) is increased and is thus likely to increase the mold deposit. This undesirably increases the frequency of maintenance of a mold and thereby reduces the mass productivity.

The following describes a production method of the polyphenylene sulfide resin (A) used according to the embodiment of the invention, but the following method is not at all restrictive and may be replaced by any other method that can produce the polyphenylene sulfide resin (A) having the above structure.

First, the following describes the details of a polyhalogenated aromatic compound, a sulfidizing agent, a polymerization solvent, a molecular weight modifier, a polymerization modifier and a polymerization stabilizer used in the production method of the polyphenylene sulfide resin (A).

[Polyhalogenated Aromatic Compound]

The polyhalogenated aromatic compound is a compound having two or more halogen atoms in one molecule. Specific examples of the polyhalogenated aromatic compound include p-dichlorobenzene, m-dichlorobenzene, o-dichlorobenzene, 1,3,5-trichlorobenzene, 1,2,4-trichlorobenzene, 1,2,4,5-tetrachlorobenzene, hexachlorobenzene, 2,5-dichlorotoluene, 2,5,-dichloro-p-xylene, 1,4-dibromobenzene, 1,4-diiodobenzene and 1-methoxy-2,5-dichlorobenzene; p-dichlorobenzene is used preferably. Additionally, two or more different polyhalogenated aromatic compounds may be used in combination to form a copolymer. This copolymer preferably has a p-dehalogenated aromatic compound as the major component.

In terms of obtaining the polyphenylene sulfide resin (A) having the viscosity suitable for processing, the used amount of the polyhalogenated aromatic compound is not less than 0.9 mol, is preferably not less than 0.95 mol and is more preferably not less than 1.005 mol per 1 mol of the sulfidizing agent. For the same reason, the used amount of the polyhalogenated aromatic compound is also not greater than 2.0 mol, is preferably not greater than 1.5 mol and is more preferably not greater than 1.2 mol per 1 mole of the sulfidizing agent.

[Sulfidizing Agent]

The sulfidizing agent may be, for example, an alkali metal sulfide, an alkali metal hydrosulfide or hydrogen sulfide.

Specific examples of the alkali metal sulfide include lithium sulfide, sodium sulfide, potassium sulfide, rubidium sulfide, cesium sulfide and mixtures of two or more of these alkali metal sulfides. Among them, sodium sulfide is preferably used. Any of these alkali metal sulfides may be used as a hydrate or an aqueous mixture or in the form of an anhydride.

Specific examples of the alkali metal hydrosulfide include sodium hydrosulfide, potassium hydrosulfide, lithium hydrosulfide, rubidium hydrosulfide, cesium hydrosulfide and mixtures of two or more of these alkali metal hydrosulfides. Among them, sodium hydrosulfide is preferably used. Any of these alkali metal hydrosulfides may be used as a hydrate or an aqueous mixture or in the form of an anhydride.

The alkali metal sulfide used may be produced in the reaction system from an alkali metal hydrosulfide and an alkali metal hydroxide. Additionally, the alkali metal sulfide may be produced in advance from an alkali metal hydrosulfide and an alkali metal hydroxide and may be transferred to a polymerization tank to be used. Alternatively the alkali metal sulfide used may be produced in the reaction system from an alkali metal hydroxide such as lithium hydroxide or sodium hydroxide and hydrogen sulfide. Additionally, the alkali metal sulfide may be produced in advance from an alkali metal hydroxide such as lithium hydroxide or sodium hydroxide and hydrogen sulfide and may be transferred to a polymerization tank to be used.

When there is a partial loss of the sulfidizing agent due to, for example, a dehydration operation prior to a start of polymerization reaction, the fed amount of the sulfidizing agent denotes a remaining amount of the sulfidizing agent determined by subtracting the loss from an actual fed amount.

Besides, an alkali metal hydroxide and/or an alkaline earth metal hydroxide may be used together with the sulfidizing agent. Preferable examples of the alkali metal hydroxide specifically include sodium hydroxide, potassium hydroxide, lithium hydroxide, rubidium hydroxide, cesium hydroxide and mixtures of two or more of these alkali metal hydroxides. Specific examples of the alkaline earth metal hydroxide include calcium hydroxide, strontium hydroxide and barium hydroxide. Among them, sodium hydroxide is preferably used.

When the alkali metal hydrosulfide is used as the sulfidizing agent, it is especially preferable to use an alkali metal hydroxide simultaneously. The used amount of the simultaneously used alkali metal hydroxide is not less than 0.95 mol, is preferably not less than 1.00 mol and is more preferably not less than 1.005 mol per 1 mol of the alkali metal hydrosulfide. The used amount of the simultaneously used alkali metal hydroxide is also not greater than 1.20 mol, is preferably not greater than 1.15 mol and is more preferably not greater than 1.100 mol per 1 mol of the alkali metal hydrosulfide.

[Polymerization Solvent]

An organic polar solvent is preferably used as the polymerization solvent. Specific examples include: N-alkyl pyrrolidones such as N-methyl-2-pyrrolidone and N-ethyl-2-pyrrolidone; caprolactams such as N-methyl-ε-caprolactam; aprotic organic solvents such as 1,3,-dimethyl-2-imidazolidinone, N,N-dimethylacetamide, N,N-dimethylformamide, hexamethylphosphoric triamide, dimethyl sulfone and tetramethylene sulfoxide; and mixtures thereof. Any of these polymerization solvents has the high reaction stability and is thus used preferably. Among them, N-methyl-2-pyrrolidone (hereinafter may be abbreviated as NMP) is especially preferably used.

The used amount of the organic polar solvent is not less than 2.0 mol, is preferably not less than 2.25 mol and is more preferably not less than 2.5 mol per 1 mol of the sulfidizing agent. The used amount of the organic polar solvent is also not greater than 10 mol, is preferably not greater than 6.0 mol and is more preferably not greater than 5.5 mol per 1 mol of the sulfidizing agent.

[Molecular Weight Modifier]

For the purpose of for example, forming terminals of the resulting PPS resin (A), controlling the polymerization reaction or modifying the molecular weight, a monohalogenated compound (not necessarily aromatic compound) may be used with the polyhalogenated aromatic compound described above.

[Polymerization Modifier]

One preferable aspect uses a polymerization modifier, in order to obtain the polyphenylene sulfide resin (A) having a relatively high degree of polymerization in a shorter time. The polymerization modifier herein means a substance having the function of increasing the viscosity of the resulting PPS resin (A). Specific examples of this polymerization modifier include organic carboxylates, water, alkali metal chlorides, organic sulfonates, alkali metal sulfates, alkaline earth metal oxides, alkali metal phosphates and alkaline earth metal phosphates. Any of these polymerization modifiers may be used alone, or alternatively two or more of these polymerization modifiers may be used simultaneously. Among them, organic carboxylates, water and alkali metal chlorides are preferable. More specifically, alkali metal carboxylates are more preferable as the organic carboxylate, and lithium chloride is more preferable as the alkali metal chloride.

The above alkali metal carboxylate is a compound expressed by a general formula $R(COOM)_n$ (in the formula, R represents an alkyl group, a cycloalkyl group, an aryl group, an alkyl aryl group or an aryl alkyl group containing 1 to 20 carbon atoms; M represents an alkali metal selected among lithium, sodium, potassium, rubidium and cesium; and n represents an integral number of 1 to 3). The alkali metal carboxylate may be used as a hydrate, an anhydride or an aqueous solution. Specific examples of the alkali metal carboxylate include lithium acetate, sodium acetate, potassium acetate, sodium propionate, lithium valerate, sodium benzoate, sodium phenylacetate, potassium p-toluate and mixtures thereof.

The alkali metal carboxylate may be obtained by mixing and reacting substantially the same chemical equivalents of an organic acid and one or more compounds selected among the group consisting of alkali metal hydroxides, alkali metal carbonates and alkali metal bicarbonates. Among the above alkali metal carboxylates, the lithium salts have high solubility in the reaction system and significant modifier effects but are expensive, while the potassium salts, the rubidium salts and the cesium salts are likely to have insufficient solubility in the reaction system. Accordingly, sodium acetate that is less expensive and has moderate solubility in the polymerization system is most preferably used.

The used amount of any of these alkali metal carboxylates used as the polymerization modifier is generally not less than 0.01 mol, is preferably not less than 0.1 mol to achieve the higher degree of polymerization, and is more preferably not less than 0.2 mol per 1 mol of the fed amount of the alkali metal sulfide. The above used amount is also generally not greater than 2 mol, is preferably not greater than 0.6 mol to achieve the higher degree of polymerization, and is more preferably not greater than 0.5 mol per 1 mol of the fed amount of the alkali metal sulfide.

The added amount of water used as the polymerization modifier is generally not less than 0.3 mol, is preferably not less than 0.6 mol to achieve the higher degree of polymerization, and is more preferably not less than 1 mol per 1 mol of the fed amount of the alkali metal sulfide. The above added amount is also generally not greater than 15 mol, is preferably not greater than 10 mol to achieve the higher degree of polymerization, and is more preferably not greater than 5 mol per 1 mol of the fed amount of the alkali metal sulfide.

It is also allowed as a matter of course to use two or more of these polymerization modifiers in combination. For example, using an alkali metal carboxylate and water together achieves a higher degree of polymerization by the smaller required amounts of the alkali metal carboxylate and water.

The timing of addition of any of these polymerization modifiers is not especially specified but may be any time at a pre-processing step, at the start of polymerization or in the middle of polymerization described later, and the polymerization modifier may be added in a plurality of additions. When an alkali metal carboxylate is used as the polymerization modifier, it is preferable to add the alkali metal carboxylate at once at the start of the pre-processing step or at the start of polymerization in the light of easy addition. When water is used as the polymerization modifier, on the other hand, it is effective to add water in the middle of the polymerization reaction after feeding the polyhalogenated aromatic compound.

[Polymerization Stabilizer]

A polymerization stabilizer may be used, in order to stabilize the polymerization reaction system and prevent side reactions. The polymerization stabilizer contributes to stabilizing the polymerization reaction system and suppresses undesired side reactions. One indication of the side reaction is generation of thiophenol. Addition of the polymerization stabilizer suppresses generation of thiophenol. Specific examples of the polymerization stabilizer are compounds such as alkali metal hydroxides, alkali metal carbonates, alkaline earth metal hydroxides and alkaline earth metal carbonates. Among them, alkali metal hydroxides such as sodium hydroxide, potassium hydroxide and lithium hydroxide are preferable. The alkali metal carboxylate described above also acts as the polymerization stabilizer and is thus to be included as one of the polymerization stabilizers. When the alkali metal hydrosulfide is used as the sulfidizing agent, it is especially preferable to use an alkali metal hydroxide simultaneously as described above. An excess of the alkali metal hydroxide relative to the sulfidizing agent may also serve as the polymerization stabilizer.

Any of these polymerization stabilizers may be used alone, or alternatively two or more of these polymerization stabilizers may be used in combination. The used amount of the polymerization stabilizer is generally not less than 0.02 mol, is preferably not less than 0.03 mol and is more preferably not less than 0.04 mol per 1 mol of the fed amount of the alkali metal sulfide. The above used amount is also generally not greater than 0.2 mol, is preferably not greater than 0.1 mol and is more preferably not greater than 0.09 mol per 1 mol of the fed amount of the alkali metal sulfide. The smaller ratio has insufficient stabilization effects, while the excessively large ratio is economically disadvantageous and is likely to reduce the polymer yield.

The timing of addition of the polymerization stabilizer is not especially specified but may be any time at the pre-processing step, at the start of polymerization or in the middle of polymerization described later, and the polymerization stabilizer may be added in a plurality of additions. It is, however, preferable to add the polymerization stabilizer at once at the start of the pre-processing step or at the start of polymerization, in the light of easy addition.

The following specifically and sequentially describes a pre-processing step, a polymerization reaction step, a recovery step and a post-processing step with respect to a preferable production method of the polyphenylene sulfide resin (A) used according to the embodiment of the invention. The production method of the polyphenylene sulfide resin (A) is, however, not limited to this method.

[Pre-Processing Step]

In the production method of the polyphenylene sulfide resin (A), the sulfidizing agent is generally used in the form of a hydrate. It is here preferable to raise the temperature of a mixture including an organic polar solvent and a sulfidizing agent and remove an excess amount of water out of the system, prior to addition of a polyhalogenated aromatic compound.

The sulfidizing agent used may be a sulfidizing agent produced in the reaction system from an alkali metal hydrosulfide and an alkali metal hydroxide or may be a sulfidizing agent produced in a different tank from a polymerization tank as described above. The procedure employed for such production is not specifically limited, but one applicable procedure may add an alkali metal hydrosulfide and an alkali metal hydroxide to an organic polar solvent under an inert gas atmosphere in a temperature range of ordinary temperature to 150° C. or preferably in a temperature range of ordinary temperature to 100° C., raise the temperature to at least 150° C. or higher or preferably to 180 to 260° C. under ordinary pressure or under reduced pressure, so as to remove water. The polymerization modifier may be added in this stage. The reaction may be performed with addition of, for example, toluene, in order to facilitate removal of water.

The water content in the polymerization system during the polymerization reaction is preferably 0.3 to 10.0 mol per 1 mol of the fed amount of the sulfidizing agent. The water content in the polymerization system means an amount determined by subtracting the amount of water removed out of the polymerization system from the amount of water fed to the polymerization system. The water fed may be in any form, such as water, an aqueous solution or water of crystallization.

[Polymerization Reaction Step]

The polyphenylene sulfide resin (A) is produced by reaction of the sulfidizing agent and the polyhalogenated aromatic compound in the organic polar solvent in a temperature range of not lower than 200° C. but lower than 290° C.

At the start of the polymerization reaction step, the organic polar solvent, the sulfidizing agent and the polyhalogenated aromatic compound are mixed preferably under an inert gas atmosphere in a temperature range of not lower than ordinary temperature or preferably not lower than 100° C. and not higher than 240° C. or preferably not higher than 230° C. The polymerization modifier may be added in this stage. These raw materials may be fed in a random order or may be fed simultaneously.

The temperature of this mixture is then raised generally to a range of 200° C. to 290° C. The rate of temperature rise is not specifically limited; but the rate of not lower than 0.01° C./minute is generally selected and the rate of not lower than 0.1° C./minute is more preferable. The rate of not higher than 5° C./minute is generally selected as the above rate of temperature rise and the rate of not higher than 3° C./minute is more preferable.

In general, the temperature is eventually raised to 250 to 290° C. The reaction is performed at the temperature generally for not shorter than 0.25 hours or preferably for not shorter than 0.5 hours. The reaction is also performed at the above temperature generally for not longer than 50 hours and preferably for not longer than 20 hours.

A method of raising the temperature to 270 to 290° C. after the reaction for a predetermined time at, for example, 200 to 260° C. at the stage prior to reaching to the final temperature is effective to achieve the higher degree of polymerization. In this application, generally the range of 0.25 hours to 20 hours or preferably the range of 0.25 to 10 hours is selected as the reaction time at 200 to 260° C.

Additionally, in some cases, multi-stage polymerization may be effective to obtain a polymer having the higher degree of polymerization. In the application of multi-stage polymerization, it is advantageous that the process goes on to a next polymerization stage at the time when the conversion ratio of the polyhalogenated aromatic compound in the system at 245° C. reaches 40 mol % or higher or preferably 60 mol %.

The conversion ratio of the polyhalogenated aromatic compound (abbreviated as PHA herein) is a value calculated by the following equations. The remaining amount of PHA is generally determined by gas chromatography.

(a) In the case of addition of an excess in molar ratio of the polyhalogenated aromatic compound relative to the alkali metal sulfide:

Conversion ratio=[feeding amount of PHA (mol)−remaining amount of PHA (mol)]/[feeding amount of PHA(mol)−excessive amount of PHA (mol)]

(b) In the case other than the above case (a):

Conversion ratio=[feeding amount of PHA(mol)−remaining amount of PHA(mol)]/[feeding amount of PHA(mol)]

[Recovery Step]

In the production method of the polyphenylene sulfide resin (A), a solid substance is recovered from a polymerization reactant including a polymer and the solvent after the end of the above polymerization reaction step. Any of known recovery techniques may be employed as the method of recovery.

For example, an available method may slowly cool down the polymerization reactant after the end of the polymerization reaction for recovery of a particulate polymer. The slow cooling rate in this application is not specifically limited but is generally about 0.1° C./minute to 3° C./minute. There is no need to slowly cool down the polymerization reactant at a constant speed over the entire slow cooling step. One applicable method may slowly cool down the polymerization reactant at the slow cooling rate of 0.1 to 1° C./minute until crystallization and deposition of the polymer particles and then slowly cool down the polymerization reactant at the slow cooling rate of not lower than 1° C./minute.

One of the preferable methods performs the above recovery under a rapid cooling condition. A flushing method may be employed as this recovery method. The flushing method flushes the polymerization reactant from the state of high temperature and high pressure (generally not lower than 250° C. and not less than 8 kg/cm$^2$) into an atmosphere of ordinary pressure or reduced pressure and thereby recovers the polymer in the powdery form simultaneously with recovery of the solvent. Flushing herein means ejecting the polymerization reactant from a nozzle. The atmosphere into which the polymerization reactant is flushed is, for example, nitrogen atmosphere or water vapor atmosphere in ordinary pressure, and the range of 150° C. to 250° C. is generally selected as the flushing temperature.

[Post-Processing Step]

The polyphenylene sulfide resin (A) may be subject to acid treatment, hot water treatment or washing with an organic solvent after production through the polymerization reaction step and the recovery step described above. The polyphenylene sulfide resin (A) may be subject to treatment with an alkali metal or treatment with an alkaline earth metal in any step during production of the polyphenylene sulfide resin (A).

The acid treatment may be performed as described below. The acid used for acid treatment of the polyphenylene sulfide resin (A) is not specifically limited but may be any acid without the action of degrading the polyphenylene sulfide resin (A). Available examples of the acid include acetic acid, hydrochloric acid, sulfuric acid, phosphoric acid, silicic acid, carbonic acid and propionic acid. Among them, acetic acid and hydrochloric acid are more preferably used. An acid that degrades or deteriorates the polyphenylene sulfide resin (A), such as nitric acid is, however, undesirable.

An available method of acid treatment is, for example, a method of soaking the polyphenylene sulfide resin (A) in an acid or an acid aqueous solution, with adequately stirring or heating as appropriate. For example, when acetic acid is used, sufficient effects are achieved by soaking the powder of PPS resin (A) in an acetic acid aqueous solution of pH 4 heated to 80 to 200° C. and stirring the resin-soaked solution for 30 minutes. The pH after the acid treatment may be not lower than 4 and may be, for example, in the range of about pH 4 to 8. The polyphenylene sulfide resin (A) subject to the acid treatment is preferably washed with water or warm water several times for removal of the remaining acid or salt. The water used for washing is preferably distilled water or deionized water, since distilled water or deionized water does not deteriorate the effects of desired chemical modification of the polyphenylene sulfide resin (A) by acid treatment.

The hot water treatment may be performed as described below. In the process of hot water treatment of the polyphenylene sulfide resin (A), the temperature of hot water is not lower than 100° C., is more preferably not lower than 120° C., is furthermore preferably not lower than 150° C. and is especially preferably not lower than 170° C. The temperature of lower than 100° C. gives little effects of desired chemical modification of the polyphenylene sulfide resin (A) and is thus undesirable.

In order to achieve the effects of desired chemical modification of the polyphenylene sulfide resin (A) by hot water treatment, the water used is preferably distilled water or deionized water. The operation of hot water treatment is not specifically limited. An available method is, for example, a method of heating a predetermined amount of the polyphenylene sulfide resin (A) in a predetermined amount of water with stirring in a pressure vessel or a method of continuously performing hot water treatment. As the ratio of the polyphenylene sulfide resin (A) to water, the greater portion of water is preferable. The liquor ratio of not greater than 200 g of the polyphenylene sulfide resin (A) to 1 liter of water is generally selected.

An inert atmosphere is preferably employed for the atmosphere of hot water treatment, in order to avoid undesired degradation of terminal groups of the polyphenylene sulfide resin (A). Additionally, it is preferable to wash the polyphenylene sulfide resin (A) subject to this hot water treatment operation with warm water several times for removal of the remaining components.

The organic solvent washing may be performed as described below. The organic solvent used for washing the polyphenylene sulfide resin (A) is not specifically limited but may be any organic solvent without the action of degrading the polyphenylene sulfide resin (A). Available examples include: nitrogen-containing polar solvents such as N-methyl-2-pyrrolidone, dimethylformamide, dimethylacetamide, 1,3-dimethylimidazolidinone, hexamethylphosphoramide and piperazinones; sulfoxide/sulfone solvents such as dimethyl sulfoxide, dimethyl sulfone and sulfolane; ketone solvents such as acetone, methyl ethyl ketone, diethyl ketone and acetophenone; ether solvents such as dimethyl ether, dipropyl ether, dioxane and tetrahydrofuran; halogen solvents such as chloroform, methylene chloride, trichloroethylene, ethylene dichloride, perchloroethylene, monochloroethane, dichloroethane, tetrachloroethane, perchloroethane and chlorobenzene; alcohol/phenol solvents such as methanol, ethanol, propanol, butanol, pentanol, ethylene glycol, propylene glycol, phenol, cresol, polyethylene glycol and polypropylene glycol; and aromatic hydrocarbon solvents such as benzene, toluene and xylene. Among these organic solvents, it is especially preferable to use, for example, N-methyl-2-pyrrolidone, acetone, dimethylformamide and chloroform. Additionally, any of these organic solvents may be used alone or alternatively may be used as a mixture of two or more of the organic solvents.

An available method of organic solvent washing is, for example, a method of soaking the polyphenylene sulfide resin (A) in the organic solvent, with adequately stirring or heating as appropriate. The washing temperature during washing of the polyphenylene sulfide resin (A) with the organic solvent is not specifically limited, but any temperature in ordinary temperature to about 300° C. may be selected. The higher washing temperature is likely to have the higher washing efficiency, but the washing temperature in ordinary temperature to 150° C. generally achieves the sufficient effects. Another available method may wash under pressure in a pressure vessel at the temperature of not lower than the boiling point of the organic solvent. The washing time is also not specifically limited. The washing time depends on the washing conditions, but washing for 5 or more minutes generally achieves the sufficient effects in the case of batch washing. Continuous washing is also available.

Available methods of alkali metal treatment or alkaline earth metal treatment include: for example, a method of adding an alkali metal salt or an alkaline earth metal salt prior to, during or after the pre-processing step described above; a method of adding an alkali metal salt or an alkaline earth metal salt in a polymerization tank prior to, during or after the polymerization step described above; and a method of adding an alkali metal salt or an alkaline earth metal salt at an initial stage, a middle stage or a final stage of the washing step described above. Among them, the simplest method is a procedure of adding an alkali metal salt or an alkaline earth metal salt after removal of the remaining oligomers and the remaining salts by washing with an organic solvent or by washing with warm water or hot water. It is preferable to introduce an alkali metal or an alkaline earth metal into the PPS resin (A) in the form of an alkali metal ion or an alkaline earth metal ion such as an acetate, a hydroxide or a carbonate. It is also preferable to remove an excess of the alkali metal salt or the alkaline earth metal salt by, for example, warm water washing. The concentration of the alkali metal ion or the alkaline earth metal ion for introduction of the alkali metal or the alkaline earth metal described above is preferably not less than 0.001 mmol and is more preferably not less than 0.01 mmol per 1 g of the PPS resin (A). The temperature of the alkali metal treatment or the alkaline earth metal treatment is preferably not lower than 50° C., is more preferably not lower than 75° C. and is especially preferably not lower than 90° C. The upper limit temperature is not especially specified but is, in general, preferably not higher than 280° C. in terms of the operability. The liquor ratio (ratio of the weight of cleaning liquid to the dry weight of PPS resin (A)) is preferably not less than 0.5, is more preferably not less than 3 and is furthermore preferably not less than 5.

The polyphenylene sulfide resin (A) may be further subject to high polymerization by thermal oxidative cross-linking treatment, which is heating treatment under an oxygen atmosphere after completion of polymerization and heating treatment with addition of a cross-linking agent such as a peroxide.

When dry heat treatment is performed for the purpose of high polymerization by thermal oxidative cross-linking, the temperature is preferably not lower than 160° C. and is more preferably not lower than 170° C. The above temperature is also preferably not higher than 260° C. and is more preferably not higher than 250° C. The oxygen concentration during the above heating treatment is not less than 5% by volume and is more preferably not less than 8% by volume. The upper limit of the oxygen concentration during the above heating treatment may be set arbitrarily, but may be about 50% by volume. The processing time of the above heating treatment is preferably not less than 0.5 hours, is more preferably not less than 1 hour and is furthermore preferably not less than 2 hours. The processing time of the above heating treatment is also preferably not greater than 100 hours, is more preferably not greater than 50 hours and is furthermore preferably not greater than 25 hours. The device for heating treatment may be a general hot air drying machine, a rotary heating device or a heating device with stirring blades. It is preferable to use the rotary heating device or the heating device with stirring blades, in order to achieve efficient and more homogeneous treatment.

The dry heat treatment may be performed with a view to suppressing thermal oxidative cross-linking and removing volatile components. The temperature of the dry heat treatment is preferably 130 to 250° C. and is more preferably in the range of 160 to 250° C. The oxygen concentration in this case is preferably less than 5% by volume and is more preferably less than 2% by volume. The processing time is preferably not less than 0.5 hours and is more preferably not less than 1 hour. The processing time is also preferably not greater than 50 hours, is more preferably not greater than 20 hours and is furthermore preferably not greater than 10 hours. The device for heating treatment may be a general hot air drying machine, a rotary heating device or a heating device with stirring blades. It is preferable to use the rotary heating device or the heating device with stirring blades, in order to achieve efficient and more homogeneous treatment.

According to the embodiment of the invention, a plurality of polyphenylene sulfide resins (A) having different melt viscosities may be used as a mixture.

(B) Polyphenylene Sulfide Resin Having Weight Loss Percentage $\Delta Wr$ of not Greater than 0.18%

The polyphenylene sulfide resin (B) according to the embodiment of the invention is a homopolymer or a copolymer including a repeating unit expressed by a formula of —(Ar—S)— as the main structural unit and preferably containing 80 mol % or more of this repeating unit, where Ar may be any of units expressed by formula (a) to formula (k) below, but among them, the formula (a) is especially preferable:

[Chem. 4]

(a)

(b)

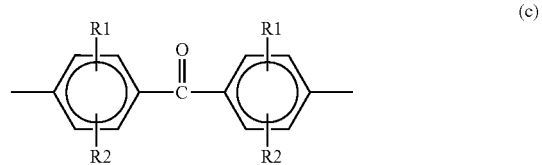

(c)

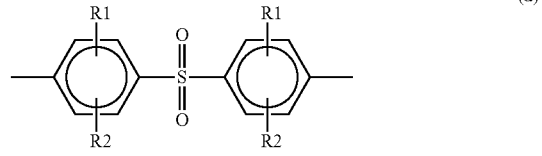

(d)

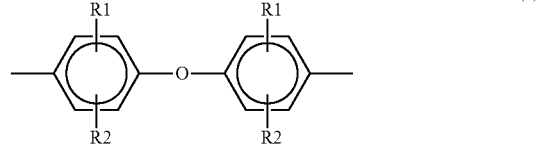

(e)

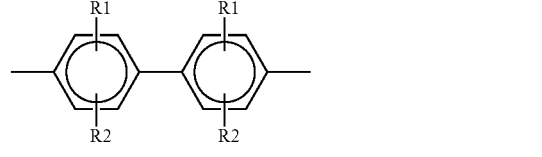

(f)

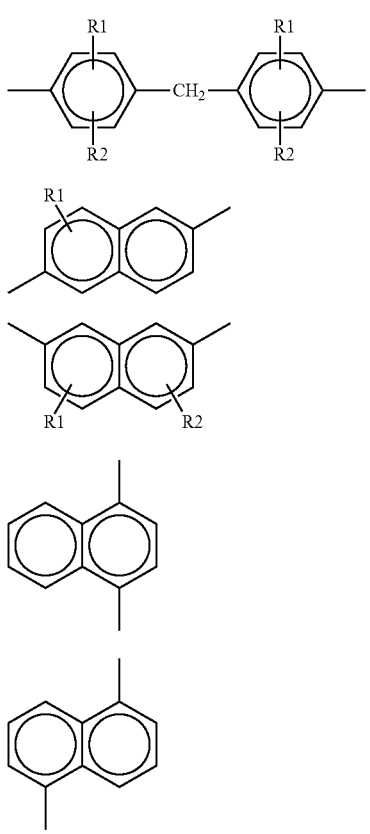

(g)

(h)

(i)

(j)

(k)

(where each of R1 and R2 represents a substituent selected among hydrogen, 1 to 12 carbon atom-containing alkyl groups, 1 to 12 carbon atom-containing alkoxy groups, 6 to 24 carbon atom-containing arylene groups and halogen groups; R1 and R2 may be identical with or different from each other).

As long as this repeating unit is the main structural unit, the polyphenylene sulfide resin (B) may include a small amount of a branch unit or a cross-linking unit, for example, expressed by any of formula (l) to formula (n) below. The copolymerization amount of such branch unit or cross-linking unit is preferably in the range of 0 to 1 mol % relative to 1 mol of the —(Ar—S)— unit.

[Chem. 5]

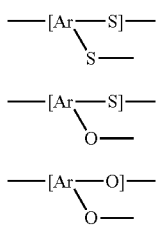

(l)

(m)

(n)

The polyphenylene sulfide resin (B) according to the embodiment of the invention may be a random copolymer or a block copolymer including the above repeating unit or may be a mixture thereof.

Typical examples are polyphenylene sulfides, polyphenylene sulfide sulfones, polyphenylene sulfide ketones, their random copolymers and block copolymers and mixtures thereof. An especially preferable example of the PAS resin (B) is a polyphenylene sulfide resin containing 80 mol % or more or specifically 90 mol % or more of p-phenylene sulfide unit as the main structure unit of the polymer:

[Chem. 2]

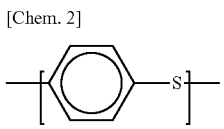

As the lower limit of the molecular weight (weight-average molecular weight) of the polyphenylene sulfide resin (B) according to the embodiment of the invention, a range of not less than 10000 is selected; preferably not less than 15000 and more preferably not less than 18000. As the upper limit of the molecular weight (weight-average molecular weight) of the polyphenylene sulfide resin (B), a range of not greater than 100000 is selected; preferably not greater than 50000 and more preferably not greater than 30000. When the lower limit of the weight-average molecular weight of the polyphenylene sulfide resin (B) is less than 10000, the outgas amount is increased during molding process to deteriorate the moldability and the mechanical strength of a molded product. When the upper limit of the weight-average molecular weight exceeds 100000, on the other hand, slower solidification in a mold causes insufficient crystallization of a molded product and is thus unlikely to have the sufficient effect of improvement in heat resistance. The smaller weight-average molecular weight of the polyphenylene sulfide resin (B) according to the embodiment of the invention causes quicker solidification of the resin in the mold and ensures the significant effect of improvement in heat resistance by high crystallization of a molded product.

The spread of the molecular weight distribution of the polyphenylene sulfide resin (B) according to the embodiment of the invention, i.e., the degree of dispersion shown by the ratio of the weight-average molecular weight to the number-average molecular weight (weight-average molecular weight/number-average molecular weight) is preferably not greater than 2.5, is more preferably not greater than 2.3, is furthermore preferably not greater than 2.1 and is especially preferably not greater than 2.0. The degree of dispersion of not greater than 2.5 is likely to decrease the amount of low molecular-weight components included in the polyphenylene sulfide resin (B). The decreased amount of the low molecular-weight components included in the PPS resin (B) causes the polyphenylene sulfide resin (B) to be likely to improve the mechanical properties in the application of molding process, decrease the outgas amount under heating and decrease the amount of elution component under exposure to a solvent. The above weight-average molecular weight and number-average molecular weight may be determined, for example, by ESC (size exclusion chromatography) using a differential refractive index detector.

The melt viscosity of the polyphenylene sulfide resin (B) according to the embodiment of the invention is not specifically limited, but a preferable range of the melt viscosity is generally a range of 5 to 10,000 Pa·s (300° C., shear rate: 1000/s). The polyphenylene sulfide resin (B) having the melt viscosity in this range is likely to have the good molding processability.

The content of an alkali metal as an impurity included in the polyphenylene sulfide resin (B) used according to the embodiment of the invention is not specifically limited, but a preferable range of the alkali metal content as the weight ratio is less than 700 ppm, in the light of development to the application of semiconductor components that need the electrical insulation properties. Controlling the alkali metal content to be less than 700 ppm desirably suppresses deterioration of the electrical insulation properties by the metal impurity. In terms of suppressing deterioration of the electrical insulation properties described above, the weight ratio of the alkali metal content in the composition of the polyphenylene sulfide resin (B) is more preferably less than 500 ppm, is furthermore preferably less than 200 ppm and is especially preferably less than 100 ppm. The alkali metal content of the polyphenylene sulfide resin (B) according to the embodiment of the invention is, for example, a value calculated from the amount of alkali metal in the ash content provided as the residue when the polyphenylene sulfide resin (B) is fired, for example, using an electric oven. The alkali metal content may be determined quantitatively by analysis of the above ash content by, for example, ion chromatography or atomic absorption spectrometry.

The alkali metal includes lithium, sodium, potassium, rubidium, cesium and francium in the group 1A of the periodic table. It is, however, preferable that the polyphenylene sulfide resin (B) according to the embodiment of the invention does not include any alkali metal other than sodium. Including an alkali metal other than sodium is likely to cause adverse effects on the electrical properties and the thermal properties of a polyphenylene sulfide resin composition. This is also likely to increase the elution amount of metal under exposure of the polyphenylene sulfide resin (B) to any of various solvents. This is especially true in the polyphenylene sulfide resin (B) including lithium. Among various metal species, compared with metal species other than alkali metals, for example, alkaline earth metals and transition metals, alkali metals are likely to have more significant effects on the electrical properties and the thermal properties of a polyphenylene sulfide resin composition and on the elution amount of metal. Controlling the content of especially the alkali metal to the above range among the various metal species is thus expected to improve the quality of the polyphenylene sulfide resin (B).

The significant characteristic of the polyphenylene sulfide resin (B) used according to the embodiment of the invention is that the weight loss percentage under heating satisfies the following Expression (2):

$$\Delta Wr = (W1 - W2)/W1 \times 100 \leq 0.18 (\%) \qquad (2)$$

Herein $\Delta Wr$ denotes weight loss percentage (%) and is a value determined from a sample weight (W2) at 330° C. based on a sample weight (W1) at 100° C. in thermogravimetric analysis from 50° C. to an arbitrary temperature of not lower than 330° C. at a temperature rise rate of 20° C./minute under ordinary-pressure, non-oxidizing atmosphere.

The weight loss percentage $\Delta Wr$ of the polyphenylene sulfide resin (B) used according to the embodiment of the invention is not greater than 0.18%, is preferably not greater than 0.12%, is more preferably not greater than 0.10% and is furthermore preferably not greater than 0.085%. The weight loss percentage $\Delta Wr$ over the above range is undesirable since this is likely to cause a problem of increasing the outgas amount in the molding process of a PPS resin composition including the polyphenylene sulfide resin (B) and is likely to reduce the mechanical strength of a molded product. This is also undesirable since this is likely to increase the deposit on a nozzle or a die during extrusion molding or increase the deposit on a mold during injection molding and thereby reduce the productivity. To the inventors' knowledge, $\Delta Wr$ of the polyphenylene sulfide resin (A) produced by the known production method exceeds 0.18%. The polyphenylene sulfide resin (B) produced by the preferable production method of the invention, however, differs from the polyphenylene sulfide resin (A) by the distribution of molecular weight and the impurity content and has extremely high purity. This may be the reason why the value of $\Delta Wr$ is significantly decreased.

$\Delta Wr$ is determinable by general thermogravimetric analysis which uses ordinary pressure non-oxidizing atmosphere as the atmosphere for analysis. The non-oxidizing atmosphere denotes an atmosphere having an oxygen concentration of not higher than 5% by volume in the gas phase which a sample is exposed to, preferably an atmosphere having the oxygen concentration of not higher than 2% by volume and more preferably an atmosphere containing substantially no oxygen, i.e., an inert gas atmosphere such as nitrogen, helium or argon. Among them, a nitrogen atmosphere is especially preferable, in the light of the economical efficiency and the easiness of handling. The ordinary pressure means a pressure approximately to the atmospheric temperature and pressure and denotes the atmospheric pressure condition at the temperature of about 25° C. and the absolute pressure of about 101.3 kPa. The atmosphere for measurement other than the atmosphere described above may cause oxidation of the PPS resin during measurement and may differ significantly from the atmosphere actually used for the molding process of the PPS resin and is thus likely to fail the measurement corresponding to the actual use conditions of the PPS resin.

For measurement of $\Delta Wr$, thermogravimetric analysis is performed with increasing the temperature from 50° C. to an arbitrary temperature of not lower than 330° C. at a temperature rise rate of 20° C./minute. A preferable procedure of thermogravimetric analysis holds the temperature at 50° C. for 1 minute and subsequently raises the temperature at the temperature rise rate of 20° C./minute. This temperature range is a temperature range frequently employed in the actual use of the polyphenylene sulfide resin and is also a temperature range frequently employed to melt the PPS in the solid state and subsequently mold the molten PPS to an arbitrary shape. The weight loss percentage in such practical use temperature range is related to the outgas amount from the PPS resin during practical use and the amount of deposit on the nozzle or on the mold during the molding process. Accordingly the PPS resin having the low weight loss percentage in this temperature range is the higher-quality, better PPS resin. It is preferable that the amount of the sample is about 10 mg for measurement of $\Delta Wr$. It is also preferable that the sample shape is fine particles of not greater than about 2 mm.

The reason why the polyphenylene sulfide resin (B) used according to the embodiment of the invention has such extremely good thermogravimetric characteristic that the weight loss percentage under heating satisfies Expression (2) given above is so far not elucidated. It is, however, presumed that the polyphenylene sulfide resin (B) used according to the embodiment of the invention has a small content of impurity components other than the PPS component and thereby achieves an extremely low weight loss percentage, which is not achieved by the known polyphenylene sulfide resin (A).

The PPS resin (B) having the characteristic of Expression (2) given above is preferably produced by heating a polyphenylene sulfide prepolymer including a cyclic polyphenylene sulfide to be converted to a high degree of polymer as described later. The conversion to the high degree of polymer will be described later in detail. The PPS resin which is obtained by conversion of the polyphenylene sulfide prepolymer to the high degree of polymer and has a weight fraction of the cyclic PPS of not greater than 40%, preferably not greater than 25% and more preferably not greater than 15% has an especially small value of ΔWr described above and is thus desirable. The weight fraction of the cyclic PPS over the above range is likely to increase the value of ΔWr. This reason is so far not elucidated, but it is presumed that the cyclic PPS contained in the PPS resin is partly vaporized under heating.

When the weight loss percentage of the polyphenylene sulfide resin (B) used according to the embodiment of the invention under heating satisfies Expression (2) given above, the condition selected among the weight-average molecular weight, the degree of dispersion and the alkali metal content of the PPS resin (B) may not be necessarily in the above range. As described above, the PPS resin including a certain amount of the cyclic PPS may also satisfy the thermogravimetric characteristic of Expression (2) given above. The condition selected among the weight-average molecular weight, the degree of dispersion and the alkali metal content of the PPS resin in the above range is, however, likely to specifically reduce the weight loss under heating and is thus desirable.

The PPS resin (B) used according to the embodiment of the invention has the excellent characteristic of the low weight loss percentage ΔWr under heating with a temperature rise. This PPS resin (B) is also likely to have another excellent characteristic of a low weight loss rate before and after heating (heating loss) when the PPS resin (B) is kept at an arbitrary constant temperature.

It is also preferable that the polyphenylene sulfide resin (B) used according to the embodiment of the invention is characteristic of an extremely small amount of production of a lactone-based compound and/or an aniline-based compound under heating. Examples of the lactone-based compound include β-propiolactone, β-butyrolactone, β-pentanolactone, β-hexanolactone, β-heptanolactone, β-octanolactone, β-nonalactone, β-decalactone, γ-butyrolactone, γ-valerolactone, γ-pentanolactone, γ-hexanolactone, γ-heptanolactone, γ-octanolactone, γ-nonalactone, γ-decalactone, δ-pentanolactone, δ-hexanolactone, δ-heptanolactone, δ-octanolactone, δ-nonalactone and δ-decalactone. Examples of the aniline-based compound include aniline, N-methylaniline, N,N-dimethylaniline, N-ethylaniline, N-methyl-N-ethylaniline, 4-chloroaniline, 4-chloro-N-methylaniline, 4-chloro-N,N-dimethylaniline, 4-chloro-N-ethylaniline, 4-chloro-N-methyl-N-ethylaniline, 3-chloroaniline, 3-chloro-N-methylaniline, 3-chloro-N,N-dimethylaniline, 3-chloro-N-ethylaniline and 3-chloro-N-methyl-N-ethylaniline.

Production of the lactone-based compound and/or the aniline-based compound by heating the polyphenylene sulfide resin (B) causes resin foaming during the molding process and mold deposit to deteriorate the molding processability and causes pollution of the ambient environment. It is accordingly desired to minimize such production. The production amount of the lactone-based compound is preferably not greater than 500 ppm on a weight basis of PAS prior to heating, is more preferably not greater than 300 ppm, is furthermore preferably not greater than 100 ppm and is especially preferably not greater than 50 ppm. Similarly the production amount of the aniline-based compound is preferably not greater than 300 ppm, is more preferably not greater than 100 ppm, is furthermore preferably not greater than 50 ppm and is especially preferably not greater than 30 ppm. The evaluation method of the production amount of the lactone-based compound and/or the aniline-based compound by heating the PAS resin may be, for example, a method of separating the gas generated during treatment at 320° C. under a non-oxidizing atmosphere for 60 minutes into components by gas chromatography and determining the components quantitatively.

The reason why only small amounts of these compounds are produced by heating the polyphenylene sulfide resin (B) used according to the embodiment of the invention is so far not elucidated. It is, however, presumed that the polyphenylene sulfide prepolymer used in the preferable production method described later including at least 50% by weight of cyclic polyphenylene sulfide and having high purity contributes to the small content of the impurities that produce the lactone-based compound and/or aniline-based compound by heating.

(B-1) Production Method of Polyarylene Sulfide

An exemplary production method of the above polyphenylene sulfide resin (B) according to the embodiment of the invention is a production method by heating a polyphenylene sulfide prepolymer including at least 50% by weight of a cyclic polyphenylene sulfide and having a weight-average molecular weight of less than 10,000 to be converted to a high degree of polymer having a weight-average molecular weight of not less than 10,000. This method readily provides the polyphenylene sulfide resin (B) having the above properties to be used according to the embodiment of the invention.

<Cyclic Polyphenylene Sulfide>

A cyclic polyphenylene sulfide (hereinafter may be abbreviated as cyclic PPS) shown by the following General Formula (I) may be used as the cyclic polyphenylene sulfide in the preferable production method of the polyphenylene sulfide resin (B) used according to the embodiment of the invention. Herein m is an integral number of 4 to 20, and the used cyclic polyphenylene sulfide may be a mixture of a plurality of different cyclic polyphenylene sulfides having different numbers m:

[Chem. 7]

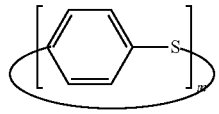

(I)

The cyclic polyphenylene sulfide may be a single compound having a single repeating number or may alternatively be a mixture of cyclic polyphenylene sulfides having different repeating numbers. The mixture of cyclic polyphenylene sulfides having different repeating numbers, is however, likely to have a lower melting temperature than the single compound having a single repeating number. The mixture of cyclic polyphenylene sulfides having different repeating numbers reduces the temperature needed for conversion to a high degree of polymer described later and is thus preferably used.

(B-2) Polyphenylene Sulfide Prepolymer

The preferable production method of the polyphenylene sulfide resin (B) used according to the embodiment of the invention is characterized by heating a polyphenylene sulfide prepolymer including the cyclic polyphenylene sulfide described above to be converted to a high degree of polymer. The polyphenylene sulfide prepolymer used herein includes at least 50% by weight or more, preferably not less than 70% by weight, more preferably not less than 80% by weight and furthermore preferably not less than 90% by weight of the cyclic polyphenylene sulfide. The upper limit of the content percentage of the cyclic polyphenylene sulfide in the polyphenylene sulfide prepolymer is not especially specified but is preferably in a range of not greater than 98% by weight. In general, the higher weight ratio of the cyclic polyphenylene sulfide in the polyphenylene sulfide prepolymer is likely to have the higher degree of polymerization and the higher melt viscosity of the resulting PPS obtained after heating. In other words, in the production method of the polyphenylene sulfide resin (B) according to the embodiment of the invention, the degree of polymerization and the melt viscosity of the resulting PPS are readily adjustable by regulating the abundance of the cyclic polyphenylene sulfide in the polyphenylene sulfide prepolymer. The weight ratio of the cyclic polyphenylene sulfide in the polyphenylene sulfide prepolymer over the above upper limit is likely to increase the melting temperature of the polyphenylene sulfide prepolymer. Controlling the weight ratio of the cyclic polyphenylene sulfide in the polyphenylene sulfide prepolymer to the above range reduces the temperature needed for conversion of the polyphenylene sulfide prepolymer to the high degree of polymer and is thus desirable.

A linear polyphenylene sulfide oligomer is especially preferable as a component other than the cyclic polyphenylene sulfide in the polyphenylene sulfide prepolymer. The linear polyphenylene sulfide oligomer herein is a homo-oligomer or a co-oligomer including a repeating unit expressed by the formula of —(Ar—S)— as the main structural unit and preferably containing 80 mol % or more of this repeating unit. Ar may be any of the units expressed by the formula (a) to formula (k) above, but among them, the formula (a) is especially preferable. As long as this repeating unit is the main structural unit, the linear polyarylene sulfide oligomer may include a small amount of a branch unit or a cross-linking unit, for example, expressed by any of the formula (l) to formula (n) above. The copolymerization amount of such branch unit or cross-linking unit is preferably in the range of 0 to 1 mol % relative to 1 mol of the —(Ar—S)— unit. The linear polyphenylene sulfide oligomer may be a random copolymer or a block copolymer including the above repeating unit or may be a mixture thereof.

Typical examples of the component other than the cyclic polyphenylene sulfide include polyphenylene sulfide oligomers, polyphenylene sulfide sulfone oligomers, polyphenylene sulfide ketone oligomers, their random copolymers and block copolymers and mixtures thereof. An especially preferable example of the linear polyphenylene sulfide oligomer is a linear polyphenylene sulfide oligomer containing 80 mol % or more or specifically preferably 90 mol % or more of p-phenylene sulfide unit as the main structure unit of the polymer.

It is especially preferable that the amount of the linear polyphenylene sulfide contained in the polyphenylene sulfide prepolymer is less than the amount of the cyclic polyphenylene sulfide contained in the polyphenylene sulfide prepolymer. In other words, the weight ratio of the cyclic polyphenylene sulfide to the linear polyphenylene sulfide (cyclic polyphenylene sulfide/linear polyarylene sulfide) in the polyphenylene sulfide prepolymer is preferably not less than 1, is more preferably not less than 2.3, is furthermore preferably not less than 4, and is especially preferably not less than 9. Using this polyphenylene sulfide prepolymer enables polyphenylene sulfide having the weight-average molecular weight of not less than 10,000 to be readily produced. Accordingly, the higher weight ratio f the cyclic polyphenylene sulfide to the linear polyphenylene sulfide in the polyphenylene sulfide prepolymer is likely to increase the weight-average molecular weight of PPS obtained by the preferable production method of the polyphenylene sulfide resin (B) according to the embodiment of the invention. The upper limit of this weight ratio is not especially specified. There is, however, a need to drastically reduce the linear PPS content in the polyphenylene sulfide prepolymer, in order to obtain the polyphenylene sulfide prepolymer having the above weight ratio of greater than 100. This takes a lot of effort. In the preferable production method of the polyphenylene sulfide resin (B) according to the embodiment of the invention, sufficiently high molecular-weight PPS is readily obtained by using the polyphenylene sulfide prepolymer having the above weight ratio of not greater than 100.

The upper limit of the molecular weight of the polyphenylene sulfide prepolymer used in the preferable production method of the polyphenylene sulfide resin (13) used according to the embodiment of the invention is the weight-average molecular weight of less than 10,000, preferably not greater than 5,000 and more preferably not greater than 3,000. The lower limit is, on the other hand, the weight-average molecular weight of not less than 300, preferably not less than 400 and more preferably not lees than 500.

The polyphenylene sulfide resin (B) used according to the embodiment of the invention is characteristic of high purity, so that it is preferable that the polyphenylene sulfide prepolymer used for production has high purity. In the polyphenylene sulfide prepolymer, the weight ratio of the alkali metal content as the impurity is preferably less than 700 ppm, is more preferably less than 500 ppm, is furthermore preferably less than 200 ppm and is especially preferably less than 100 ppm. When the method of heating the polyphenylene sulfide prepolymer to be converted to a high degree of polymer is employed for production of the polyphenylene sulfide resin (B) used according to the embodiment of the invention, the alkali metal content of the resulting PPS generally depends on the alkali metal content of the polyphenylene sulfide prepolymer. The alkali metal content of the polyphenylene sulfide prepolymer exceeding the above range may thus cause the alkali metal content of the resulting PPS to exceed the range of the alkali metal content of the polyphenylene sulfide resin (B) according to the embodiment of the invention. The alkali metal content of the polyphenylene sulfide prepolymer is, for example, a value calculated from the amount of alkali metal in the ash content provided as the residue when the polyphenylene sulfide prepolymer is fired, for example, using an electric oven. The alkali metal content may be determined quantitatively by analysis of the above ash content by, for example, ion chromatography or atomic absorption spectrometry.

The alkali metal includes lithium, sodium, potassium, rubidium, cesium and francium in the group 1A of the periodic table. It is, however, preferable that the polyphenylene sulfide prepolymer according to the embodiment of the invention does not include any alkali metal other than sodium.

The reaction of heating the polyphenylene sulfide prepolymer to be converted to the high degree of polymer is preferably performed under the condition that the weight ratio of the alkali metal content in the reaction system is less than 700 ppm, preferably not greater than 500 ppm, more preferably not greater than 300 ppm and furthermore preferably not greater than 100 ppm. The reaction of heating the polyphenylene sulfide prepolymer to be converted to the high degree of polymer is also preferably performed under the condition that the ratio of disulfide weight to total sulfur weight in the reaction system is less than 1% by weight, preferably less than 0.5% by weight, more preferably less than 0.3% by weight and furthermore preferably less than 0.1% by weight.

An ionic compound containing an alkali metal and/or another metal component or a compound having radical-generating capacity may be used as a catalyst component with a view to accelerating the reaction of conversion to a high degree of polymer. Using the above catalyst component is, however, likely to increase the above weight loss during heating of polyphenylene sulfide. It is accordingly preferable not to use such a catalyst component. When the ionic compound is used as the catalyst component, available examples of the ionic compound are sodium salts of thiophenols and alkali metal salts of sulfur. When the compound having radical-generating capacity is used, available examples of the compound having radical-generating capacity are compounds generating a sulfur radical by heating or more specifically compounds having a disulfide bond.

Unlike the case of using the ionic compound or the compound having radical-generating capacity as the catalyst component, using a zerovalent transition metal compound as the catalyst component is likely to suppress the increase in weight loss during heating of the resulting polyphenylene sulfide. It is accordingly preferable to use the zerovalent transition metal compound when the catalyst component is used for the purpose of accelerating the reaction of conversion to a high degree of polymer.

(B-3) Production Method of Polyphenylene Sulfide Prepolymer

For example, the following procedures may be employed as the method of producing the above polyphenylene sulfide prepolymer.

(1) The procedure heats a mixture including at least a polyhalogenated aromatic compound, a sulfidizing agent and an organic polar solvent to polymerize a polyarylene sulfide resin and thereby produces a mixture including granular PPS resin separable by a 80-mesh sieve (aperture: 0.125 mm), a PPS component other than the above granular PPS resin (called polyphenylene sulfide oligomer), which is produced during polymerization, the organic polar solvent, water and a halogenated alkali metal salt. The procedure subsequently separates and recovers the polyphenylene sulfide oligomer included in this mixture and makes the recovered polyphenylene sulfide oligomer subject to a purification operation, so as to obtain the polyphenylene sulfide prepolymer.

(2) The procedure heats a mixture including at least a polyhalogenated aromatic compound, a sulfidizing agent and an organic polar solvent to polymerize a polyphenylene sulfide resin. After completion of polymerization, the procedure removes the organic polar solvent by a known technique to produce a mixture including the polyphenylene sulfide resin, water and a halogenated alkali metal salt. A polyphenylene sulfide resin including a polyphenylene sulfide prepolymer is obtained by purifying this mixture by a known technique. The obtained polyphenylene sulfide resin is subject to reprecipitation using a poor solvent, so that the polyphenylene sulfide prepolymer is recovered.

(B-4) Conversion of Polyphenylene Sulfide Prepolymer to High Degree of Polymer

It is preferable that the polyphenylene sulfide resin (B) according to the embodiment of the invention described above is produced by heating the above polyphenylene sulfide prepolymer to be converted to a high degree of polymer. The temperature of such heating is preferably a temperature of melting the above polyphenylene sulfide prepolymer and is not specifically limited in this temperature range. The heating temperature lower than the melting temperature of the polyphenylene sulfide prepolymer is likely to extend the time needed for obtaining the high degree of polymer. The melting temperature of the polyphenylene sulfide prepolymer changes depending on the composition and the molecular weight of the polyphenylene sulfide prepolymer and the environments during heating and is thus not unequivocally specified. The melting temperature may be estimated, for example, by analysis of the polyphenylene sulfide prepolymer with a differential scanning calorimeter. The excessively high heating temperature is, however, likely to cause undesired side reactions, such as cross-linking reactions between the polyphenylene sulfide prepolymers, between the high degrees of polymers produced by heating and between the high degree of polymer and the polyphenylene sulfide prepolymer and degradation reaction and may deteriorate the properties of the resulting PPS resin. It is accordingly desired to avoid such temperature that significantly causes these undesired side reactions. The heating temperature is, for example, not lower than 180° C., is preferably not lower than 200° C. and is more preferably not lower than 250° C. The heating temperature is also, for example, not higher than 400° C., is preferably not higher than 380° C. and is more preferably not higher than 360° C.

The time for above heating changes depending on various properties, such as the content ratio, the number m and the molecular weight, of the cyclic polyphenylene sulfide in the used polyphenylene sulfide prepolymer and the conditions such as the heating temperature and is not unequivocally specified. The heating time is preferably set to minimize the above undesired side reactions. The heating time is, for example, not less than 0.05 hours and is preferably not less than 0.1 hours. The heating time is also, for example, not greater than 100 hours, is preferably not greater than 20 hours and is more preferably not greater than 10 hours. The heating time of less than 0.05 hours is likely to cause insufficient conversion of the polyphenylene sulfide prepolymer to the high degree of polymer. The heating time of greater than 100 hours is, on the other hand, likely to cause adverse effects of the undesired side reactions on the properties of the PPS resin and may lead to economic disadvantage.

The conversion of the polyphenylene sulfide prepolymer to the high degree of polymer by heating generally proceeds in the absence of a solvent but may proceed in the presence of a solvent. The solvent is not specifically limited but may be any solvent that neither interferes with the conversion of the polyphenylene sulfide prepolymer to the high degree of polymer by heating nor substantially causes undesired side reactions such decomposition and cross-linking of the produced high degree of polymer. Available examples of the solvent include: nitrogen-containing polar solvents such as N-methyl-2-pyrrolidone, dimethylformamide and dimethylacetamide; sulfoxide/sulfone solvents such as dimethyl sulfoxide and dimethyl sulfone; ketone solvents such as acetone, methyl ethyl ketone, diethyl ketone and acetophenone; ether solvents such as dimethyl ether, dipropyl ether and tetrahydrofuran; halogen solvents such as chloroform, methylene chloride, trichloroethylene, ethylene dichloride, dichloroethane, tetrachloroethane and chlorobenzene; alcohol/phenol solvents such as methanol, ethanol, propanol, butanol, pentanol, ethylene glycol, propylene glycol, phenol, cresol and polyethylene glycol; and aromatic hydrocarbon solvents such as benzene, toluene and xylene. An inorganic compound such as carbon dioxide, nitrogen or water may be used in the state of supercritical fluid for the solvent. Any of these solvents may be used alone, or alternatively two or more of these solvents may be used as a mixture.

The conversion of the above polyphenylene sulfide prepolymer to the high degree of polymer by heating may be naturally performed using a general polymerization reaction apparatus and may be performed using any apparatus having a heating mechanism without any specific limitations, for example, using a mold for producing a molded product or using an extruder or a melt kneading machine. A known technique such as batch system or continuous system may be employed for such conversion. The atmosphere during the conversion of the polyphenylene sulfide prepolymer to the high degree of polymer by heating is preferably a non-oxidizing atmosphere, and the reduced pressure condition is also preferable. When the conversion is performed under the reduced pressure condition, it is preferable to control the atmosphere in the reaction system first to the non-oxidizing atmosphere and subsequently to the reduced pressure condition. This is likely to suppress the occurrence of undesired side reactions, such as cross-linking reactions between the polyphenylene sulfide prepolymers, between the high degrees of polymers produced by heating and between the high degree of polymer and the polyphenylene sulfide prepolymer and degradation reaction. The non-oxidizing atmosphere denotes an atmosphere having an oxygen concentration of not higher than 5% by volume in the gas phase which the polyphenylene sulfide prepolymer is exposed to, preferably an atmosphere having the oxygen concentration of not higher than 2% by volume and more preferably an atmosphere containing substantially no oxygen. The atmosphere containing substantially no oxygen indicates an inert gas atmosphere such as nitrogen, helium or argon. Among them, a nitrogen atmosphere is especially preferable, in the light of the economical efficiency and the easiness of handling. The reduced pressure condition means that the pressure in the reaction system is lower than the atmospheric pressure. The upper limit is preferably not higher than 50 kPa, is more preferably not higher than 20 kPa and is furthermore preferably not higher than 10 kPa. The lower limit of the pressure in the system is, for example, not lower than 0.1 kPa. The reduced pressure condition having the pressure of higher than the preferable upper limit is likely to cause the undesired side reactions such as cross-linking reactions. The reduced pressure condition having the pressure of lower than the preferable lower limit is, on the other hand, like to cause vaporization of the low molecular-weight cyclic polyphenylene sulfide included in the polyphenylene sulfide prepolymer at some reaction temperature.

(C) Fibrous and/or Non-Fibrous Filler

Examples of the fibrous filler according to the embodiment of the invention include: glass fibers, milled glass fibers, carbon fibers, metal fibers, carbon nanotubes, carbon nanohorns, aramid fibers, ceramic fibers and mineral fibers. Among them, examples of the mineral fibers include potassium titanate whiskers, zinc oxide whiskers, calcium carbonate whiskers, wollastonite whiskers, asbestos fibers and gypsum fibers. Examples of the ceramic fibers include alumina fibers and silicon carbide fibers. The preferable fibrous filler according to the embodiment of the invention is generally called short-fiber filler having the fiber length of 1 to 5 mm and the fiber diameter of 1 to 25 μm before mixing. Using such short-fiber filler is likely to provide a resin composition having good dispersibility of the filler.

Examples of the non-fibrous filler, on the other hand, include: silicates such as zeolite, sericite, mica, talc, kaolin, clay, pyrophillite, bentonite, alumina silicate and glass powder; metal compounds such as alumina, silicon oxide, magnesium oxide, zirconium oxide, titanium oxide and iron oxide; carbonates such as calcium carbonate, magnesium carbonate and dolomite; sulfates such as calcium sulfate and barium sulfate; hydroxides such as calcium hydroxide, magnesium hydroxide and aluminum hydroxide; glass beads, ceramic beads, boron nitride, silicon carbide, graphite, carbon black, fullerene and silica.

Among these fibrous and/or non-fibrous fillers, glass fibers, silica and calcium carbonate are preferable; calcium carbonate and silica are especially preferable in terms of the effects of an anticorrosive and a lubricant. The fibrous and/or non-fibrous filler may be hollow. Two or more of these fillers may be used in combination. It is preferable that any of these fillers is used after pretreatment with a coupling agent such as an isocyanate compound, an organosilane compound, an organotitanate compound, an organoboron compound or an epoxy compound, in terms of obtaining the better mechanical strength.

(D) Alkoxysilane Compound Having One or More Groups Selected Among Epoxy Group, Amino Group, Isocyanate Group, Hydroxyl Group, Mercapto Group and Ureido Group Specific examples of the alkoxysilane compound (D) having one or more groups selected among epoxy group, amino group, isocyanate group, hydroxyl group, mercapto group and ureido group include: epoxy group-containing alkoxysilane compounds such as γ-glycidoxypropyltrimethoxysilane, γ-glycidoxypropyltriethoxysilane and β-(3,4-epoxycyclohexyl)ethyltrimethoxysilane; mercapto group-containing alkoxysilane compounds such as γ-mercaptopropyltrimethoxysilane and γ-mercaptopropyltriethoxysilane; ureido group-containing alkoxysilane compounds such as γ-ureidopropyltriethoxysilane, γ-ureidopropyltrimethoxysilane and γ-(2-ureidoethyl)aminopropyltrimethoxysilane; isocyanate group-containing alkoxysilane compounds such as γ-isocyanatopropyltriethoxysilane, γ-isocyanatopropyltrimethoxysilane, γ-isocyanatopropylmethyldimethoxysilane, γ-isocyanatopropylmethyldiethoxysilane, γ-isocyanatopropylethyldimethoxysilane, γ-isocyanatopropylethyldiethoxysilane and γ-isocyanatopropyltrichlorosilane; amino group-containing alkoxysilane compounds such as γ-(2-aminoethyl)aminopropylmethyldimethoxysilane, γ-(2-aminoethyl)aminopropyltrimethoxysilane and γ-aminopropyltrimethoxysilan; and hydroxyl group-containing alkoxysilane compounds such as γ-hydroxypropyltrimethoxysilane and γ-hydroxypropyltriethoxysilane.

(E) Functional Group-Containing Olefin Copolymer

Available examples of the functional group-containing olefin copolymer (E) used according to the embodiment of the invention include epoxy group-containing olefin copolymers, carboxyl group-containing olefin copolymers, acid anhydride group-containing olefin copolymers, amino group-containing olefin copolymer and mercapto group-containing olefin copolymers. Among them, epoxy group containing-olefin copolymers especially have good compatibility with the PPS resin and high toughness and are thus preferably used. The epoxy group-containing olefin copolymer used according to the embodiment of the invention may be an olefin copolymer obtained by introducing an epoxy group-containing monomer component into the olefin copolymer. A copolymer having an epoxidized double bond of an olefin polymer having the double bond in the main chain may also be used.

Examples of a functional group-containing component for introducing the epoxy group-containing monomer component into the olefin copolymer include epoxy group-containing monomers such as glycidyl acrylate, glycidyl methacrylate, glycidyl ethacrylate, glycidyl itaconate and glycidyl citraconate.

The method of introducing any of these epoxy group-containing components is not specifically limited but may be, for example, a method of copolymerizing the epoxy group-containing component with, for example, an α-olefin or a method of grafting into an olefin copolymer using a radical initiator.

The introduced amount of the epoxy group-containing monomer component is suitably not less than 0.001 mol % and preferably not less than 0.01 mol % relative to the entire amount of monomers as the raw material of the epoxy group-containing olefin copolymer. The above introduced amount is also suitably not greater than 40 mol % and preferably not greater than 35 mol % relative to the entire amount of monomers as the raw material of the epoxy group-containing olefin copolymer.

The functional group-containing olefin copolymer (E) especially useful according to the embodiment of the invention is olefin copolymers comprised of α-olefin and glycidyl ester of α,β-unsaturated carboxylic acid as the copolymerization components. A preferable example of the above α-olefin is ethylene. Any of α,β-unsaturated carboxylic acids and their alkyl esters such as acrylic acid, methyl acrylate, ethyl acrylate, butyl acrylate, methacrylic acid, methyl methacrylate, ethyl methacrylate and butyl methacrylate; styrene; or acrylonitrile may be further copolymerized with any of these copolymers.

The copolymerization method of such olefin copolymer may be any of random, alternating, block and graft copolymerization.

According to the embodiment of the invention, it is preferable to use an olefin copolymer obtained by copolymerization α-olefin and glycidyl ester of α,β-unsaturated carboxylic acid. Among them, especially preferable is an olefin copolymer obtained by copolymerization of 60 to 99% by weight of α-olefin and 1 to 40% by weight of glycidyl ester of α,β-unsaturated carboxylic acid.

The above glycidyl ester of α,β-unsaturated carboxylic acid is a compound shown as:

[Chem. 8]

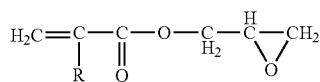

(where R in this formula represents hydrogen atom or a linear or branched lower alkyl group containing 1 to 6 carbon atoms). Specific examples include glycidyl acrylate, glycidyl methacrylate and glycidyl ethacrylate; among them, glycidyl methacrylate is preferably used.

Concrete examples of the olefin copolymer comprised of α-olefin and glycidyl ester of α,β-unsaturated carboxylic acid as the essential copolymerization components include: ethylene/propylene-g-glycidyl methacrylate copolymer ("g" represents graft: the same applies hereafter), ethylene/butene-1-g-glycidyl methacrylate copolymer, ethylene-glycidyl methacrylate copolymer-g-polystyrene, ethylene-glycidyl methacrylate copolymer-g-acrylonitrile-styrene copolymer, ethylene-glycidyl methacrylate copolymer-g-PMMA, ethylene/glycidyl acrylate copolymer, ethylene/glycidyl methacrylate copolymer, ethylene/methyl acrylate/l glycidyl methacrylate copolymer and ethylene/methyl methacrylate/l glycidyl methacrylate copolymer. Among them, ethylene/glycidyl methacrylate copolymer, ethylene/methyl acrylate/l glycidyl methacrylate copolymer and ethylene/methyl methacrylate/glycidyl methacrylate copolymer are preferably used.

Among the functional group-containing olefin copolymers used according to the embodiment of the invention, carboxyl group-containing olefin copolymer, acid anhydride group-containing olefin copolymer, amino group-containing olefin copolymer or mercapto group-containing olefin copolymer is obtained by introducing the monomer component having carboxyl group, acid anhydride group, amino group or mercapto group into the olefin copolymer. The above functional group-containing olefin copolymer may be a copolymer obtained by introducing the above functional group into a double bond of an olefin copolymer having the double bond in the main chain. Examples of the especially useful olefin copolymer are ethylene-α-olefin copolymers obtained by copolymerization of ethylene and α-olefin containing 3 to 20 carbon atoms. Concrete examples of the above α-olefin containing 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, 3-methyl-1-butene, 3-methyl-1-pentene, 3-ethyl-1-pentene, 4-methyl-1-pentene, 4-methyl-1-hexene, 4,4-dimentyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and their combinations. Copolymers using α-olefins containing 6 to 12 carbon atoms among these α-olefins are more preferable, since these copolymers achieve enhanced mechanical strength and further improvement in modification effects.

Other available examples of the olefin copolymer include polyethylene, polypropylene, polystyrene, polybutene, ethylene-propylene-diene copolymer, styrene-butadiene copolymer, styrene-butadiene-styrene block copolymer (SBS), styrene-isoprene-styrene block copolymer (SIS), polybutadiene, butadiene-acrylonitrile copolymer, polyisoprene, butene-isoprene copolymer, styrene-ethylene-butylene-styrene block copolymer (SEBS), styrene-ethylene-propylene-styrene block copolymer (SEPS) and olefin copolymers comprised of the above α-olefin and the alkyl ester of α,β-unsaturated carboxylic acid described above. Another available example is a copolymer that includes at least 50% by weight of ethylene, 1 to 35% by weight of an acid-containing unsaturated monocarboxylic acid and 0 to 49% by weight of at least one component selected among alkyl acrylate, alkyl methacrylate, vinyl ether, carbon monoxide and sulfur dioxide and has acid groups neutralized with metal ion by 0 to 100%. More specifically, this ethylene copolymer includes at least 60% by weight of ethylene, 5 to 15% by weight of acrylic acid or methacrylic acid, 0 to 25% by weight of at least one component selected among methyl acrylate, isobutyl acrylate and n-methyl acrylate and has acid groups neutralized with metal ion selected among lithium, potassium, sodium, zinc, magnesium, aluminum and calcium by 0 to 70% or preferably 30 to 70%. Preferable examples of the ethylene copolymer suitably used here include ethylene/acrylic acid, ethylene/methacrylic acid (E/MAA), ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/ethyl vinyl ether, ethylene/acrylic acid/butyl vinyl ether, ethylene/acrylic acid/methyl acrylate, ethylene/methacrylic acid/ethyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether.

Available examples of the functional group-containing component for introducing the monomer component having carboxyl group or acid anhydride group into the olefin copolymer are monomers including any of acid anhydrides such as maleic anhydride, succinic anhydride and fumaric anhydride; carboxylic acids and carboxylates such as acrylic acid, methacrylic acid, vinyl acetate and Na, Zn, K, Ca and Mg salts.

Available examples of the functional group-containing component for introducing the monomer component having amino group or mercapto group into the olefin copolymer are monomers including any of alkoxysilane compounds such as γ-mercaptopropyltrimethoxysilane, γ-mercaptopropyltriethoxysilane, γ-(2-aminoethyl)aminopropylmethyldimethoxysilane, γ-(2-aminoethyl)aminopropyltrimethoxysilane and γ-aminopropyltrimethoxysilan.

The method of introducing the functional group-containing component having carboxyl group, acid anhydride group, amino group or mercapto group into the olefin copolymer is not specifically limited but may be, for example, a method of copolymerization of the olefin copolymer with the functional group-containing component, a method of graft copolymerization of the olefin copolymer with the functional group-containing component using a radical initiator, or a method of surface treatment of the olefin copolymer. The introduced amount of the above functional group-containing monomer component is not less than 0.001 mol % and preferably not less than 0.01 mol % relative to the amount of the olefin copolymer. The introduced amount is also not greater than 40 mol % and preferably not greater than 35 mol %.

The melt flow rate (hereinafter abbreviated as MFR: measured at 190° C. with 2160 gram-weight in conformity with the standard ASTM D 1238) of the olefin copolymer containing carboxyl group, acid anhydride group, amino group or mercapto group used according to the embodiment of the invention is preferably not less than 0.01 g/10 minutes and is more preferably not less than 0.03 g/10 minutes. The MFR is also preferably not greater than 70 g/10 minutes and is more preferably not greater than 60 g/10 minutes. It should be noted that the MFR of less than 0.01 g/10 minutes may deteriorate the flowability, while the MFR of greater than 70 g/10 minutes may deteriorate the impact strength according to the shape of a molded product.

Additionally, the density of the olefin copolymer containing carboxyl group, acid anhydride group, amino group or mercapto group used according to the embodiment of the invention is preferably 800 to 870 kg/m$^3$. The density of greater than 870 kg/m$^3$ is unlikely to provide toughness at low temperature, while the density of less than 800 kg/m$^3$ is likely to deteriorate the handling property.

(F) Olefin Copolymer without Containing Functional Group

The olefin copolymer without containing functional group (F) especially useful according to the embodiment of the invention is an ethylene-α-olefin copolymer obtained by copolymerization of ethylene and α-olefin containing 3 to 20 carbon atoms. Concrete examples of the above α-olefin containing 3 to 20 carbon atoms include propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosen, 3-methyl-1-butene, 3-methyl-1-pentene, 3-ethyl-1-pentene, 4-methyl-1-pentene, 4-methyl-1-hexene, 4,4-dimentyl-1-hexene, 4,4-dimethyl-1-pentene, 4-ethyl-1-hexene, 3-ethyl-1-hexene, 9-methyl-1-decene, 11-methyl-1-dodecene, 12-ethyl-1-tetradecene and their combinations. Copolymers using α-olefins containing 6 to 12 carbon atoms among these α-olefins are more preferable, since these copolymers achieve enhanced mechanical strength and further improvement in modification effects.

Other available examples of the olefin copolymer without containing functional group (F) include polyethylene, polypropylene, polystyrene, polybutene, ethylene-propylene-diene copolymer, styrene-butadiene copolymer, styrene-butadiene-styrene block copolymer (SBS), styrene-isoprene-styrene block copolymer (SIS), polybutadiene, butadiene-acrylonitrile copolymer, polyisoprene, butene-isoprene copolymer, styrene-ethylene-butylene-styrene block copolymer (SEBS), styrene-ethylene-propylene-styrene block copolymer (SEPS) and olefin copolymers comprised of the above α-olefin and the alkyl ester of α, β-unsaturated carboxylic acid described above.

Another available example is a copolymer that includes at least 50% by weight of ethylene, 1 to 35% by weight of an acid-containing unsaturated monocarboxylic acid and 0 to 49% by weight of at least one component selected among alkyl acrylate, alkyl methacrylate, vinyl ether, carbon monoxide and sulfur dioxide and has acid groups neutralized with metal ion by 0 to 100%. More specifically, this ethylene copolymer includes at least 60% by weight of ethylene, 5 to 15% by weight of acrylic acid or methacrylic acid, 0 to 25% by weight of at least one component selected among methyl acrylate, isobutyl acrylate and n-methyl acrylate and has acid groups neutralized with metal ion selected among lithium, potassium, sodium, zinc, magnesium, aluminum and calcium by 0 to 70% or preferably 30 to 70%.

Preferable examples of the ethylene copolymer suitably used here include ethylene/acrylic acid, ethylene/methacrylic acid (E/MAA), ethylene/acrylic acid/n-butyl acrylate, ethylene/methacrylic acid/n-butyl acrylate, ethylene/methacrylic acid/isobutyl acrylate, ethylene/acrylic acid/isobutyl acrylate, ethylene/methacrylic acid/n-butyl methacrylate, ethylene/acrylic acid/methyl methacrylate, ethylene/acrylic acid/ethyl vinyl ether, ethylene/acrylic acid/butyl vinyl ether, ethylene/acrylic acid/methyl acrylate, ethylene/methacrylic acid/ethyl acrylate, ethylene/methacrylic acid/methyl methacrylate, ethylene/acrylic acid/n-butyl methacrylate, ethylene/methacrylic acid/ethyl vinyl ether and ethylene/acrylic acid/butyl vinyl ether.

The melt flow rate (MFR) of the olefin copolymer without containing functional group (F) used according to the embodiment of the invention is preferably not less than 0.01 g/10 minutes and is more preferably not less than 0.03 g/10 minutes. The above MFR is also preferably not greater than 70 g/10 minutes and is more preferably not greater than 60 g/10 minutes. It should be noted that the MFR of less than 0.01 g/10 minutes may deteriorate the flowability, while the MFR of greater than 70 g/10 minutes may deteriorate the impact strength according to the shape of a molded product.

The density of the olefin copolymer without containing functional group (F) used according to the embodiment of the invention is preferably 800 to 870 kg/ma. The density of greater than 870 kg/m is unlikely to provide toughness at low temperature, while the density of less than 800 kg/ma is likely to deteriorate the handling property.

[PPS Resin Composition Obtained by Mixing Component (A) with Component (B)]

In the PPS resin composition according to the embodiment of the invention, as described above, the component (A) is the polyphenylene sulfide resin having the weight loss percentage ΔWr of greater than 0.18% under heating, and the component (B) is the polyphenylene sulfide resin having the weight loss percentage ΔWr of not greater than 0.18% under heating. In the PPS resin composition obtained by mixing these components (A) and (B), when the total of the component (A) and the component (B) is equal to 100% by weight, the mixing ratio of the component (A) is selected to be not greater than 95% by weight, is preferably not greater than 90% by weight, is more preferably not greater than 85% by weight and is furthermore preferably not greater than 80% by weight. The mixing ratio of the component (A) is also selected to be not less than 5% by weight, is preferably not less than 30% by weight, is more preferably not less than 40% by weight and is furthermore preferably not less than 50% by weight. The mixing ratio of the component (B) of less than 5% by weight does not achieve the sufficient effect of improvement in heat resistance and is thus undesirable. The mixing ratio of the component (B) of greater than 95% by weight, on the other hand, highly accelerates solidification of the resin in the mold, which may cause short shot in the case of injection molding of especially a thin-wall molded product, and is thus undesirable.

The PPS resin composition according to the embodiment of the invention has extremely good heat resistance. The deflection temperature of a resin molded product under load of 0.46 MPa (measured in conformity with ASTM D648) is not lower than 200° C., is preferably not lower than 220° C. and is furthermore preferably not lower than 240° C.

[PPS Resin Composition Obtained by Further Mixing Component (C) in Addition to Components (A) and (B)]

When the PPS resin composition according to the embodiment of the invention further includes the component (C) in addition to the components (A) and (B), the mixing ratio of the component (A) is to be selected in the range of 95 to 5% by weight when the total of the component (A) and the component (B) is equal to 100% by weight. Specifically, in order to significantly improve the molding processability, the heat resistance and the surface smoothness of the PPS resin composition according to the embodiment of the invention, the mixing ratio of the component (A) is preferably selected in the range of 5 to 20% by weight, when the total of the component (A) and the component (B) is equal to 100% by weight. In order to significantly improve the material rigidity of the PPS resin composition according to the embodiment of the invention, the mixing ratio of the component (A) is preferably selected in the range of 80 to 95% by weight, when the total of the component (A) and the component (B) is equal to 100% by weight. The mixing ratio of the component (B) of less than 5% by weight slows solidification on the surface layer of a molded product in the mold and drastically increases the waviness of the molten resin in the flow direction, which may cause a flow mark or a sink mark of the molded product (poor appearance by a concave on the surface of the molded product). This makes it difficult to obtain a molded product having the high degree of surface smoothness. The mixing ratio of the component (B) of greater than 95% by weight, on the other hand, interferes with the adhesiveness with the filler and causes uneven distribution of the filler on the surface of a molded product. This significantly deteriorates the surface smoothness and the mechanical strength and is thus undesirable.

According to the embodiment of the invention, the amount of the fibrous and/or non-fibrous filler (C) added is selected in a range of not greater than 500 parts by weight, more preferably in a range of not greater than 350 parts by weight and furthermore preferably in a range of not greater than 200 parts by weight as the upper limit relative to the total of 100 parts by weight of the component (A) and the component (B). The lower limit of the amount of the component (C) added is selected in a range of not less than 1 part by weight, more preferably in a range of not less than 10 parts by weight and furthermore preferably in a range of not less than 15 parts by weight. Addition of the amount of the component (C) greater than 500 parts by weight significantly interferes with the melt flowability and is thus undesirable. Addition of the amount of the component (C) less than 1 part by weight does not achieve the sufficient filler reinforcement effect and is thus undesirable. The polyphenylene sulfide resin composition according to the embodiment of the invention includes preferably not less than 50% by volume of or more preferably not less than 55% by volume of the component (A) and the component (B), when the total of the component (A), the component (B) and the component (C) is equal to 100% by volume. This range is likely to provide the good processability.

According to the embodiment of the invention, further mixing the component (D) in addition to the component (A), the component (B) and the component (C) enhances the adhesiveness between the PPS resin and the filler, ensures the high rigidity and additionally provides the good surface smoothness. The amount of the alkoxysilane compound (D) having one or more groups selected among epoxy group, amino group, isocyanate group, hydroxyl group, mercapto group and ureido group added is selected to be not less than 0.05 parts by weight and is more preferably not less than 0.1 parts by weight relative to the total of 100 parts by weight of the component (A), the component (B) and the component (C). The amount of the component (D) added is selected to be not greater than 10 parts by weight and is more preferably not greater than 5 parts by weight relative to the total of 100 parts by weight of the component (A), the component (B) and the component (C).

The PPS resin composition according to the embodiment of the invention has the synergy effects of the enhancement of the adhesiveness with the filler by addition of the component (A) and the high crystallinity on the surface layer of a molded product by addition of the component (B). Such synergy effects prevent the uneven distribution of the filler on the surface of a molded product, which occurs in the conventional filler-reinforced PPS resin composition, and significantly suppress the waviness of the molten resin in the flow direction, thus remarkably improving the surface smoothness. It has been found that the uneven distribution of the filler on the surface of a molded product of the PPS resin composition according to the embodiment of the invention has clear correlations to center line waviness Ra and melt crystallization temperature Tmc and that the waviness of the molten resin in the flow direction on the surface of a molded product has clear correlations to arithmetic mean waviness Wa and melt crystallization temperature Tmc.

The center line waviness Ra according to the embodiment of the invention is a numerical value measured in conformity with JIS B0601 using an ASTM No. 1 dumbbell test piece obtained from the PPS resin composition. In the PPS resin composition according to the embodiment of the invention, the center line waviness Ra is not greater than 1.0 μm, is preferably not greater than 0.7 μm and is more preferably not greater than 0.5 μm. The PPS resin composition according to the embodiment of the invention with the center line waviness Ra controlled to be not greater than 1.0 μm is desirable, since this significantly suppresses the uneven distribution of the filler on the surface layer of a molded product and provides the appearance of the molded product without the uneven distribution of the filler.

The arithmetic mean waviness Wa according to the embodiment of the invention is a numerical value measured in conformity with JIS B0601 using an ASTM No. 1 dumbbell test piece obtained from the PPS resin composition. In the PPS resin composition according to the embodiment of the invention, the arithmetic mean waviness Wa is not greater than 3.0 μm, is preferably not greater than 2 μm and is more preferably not greater than 1.65 μm. The PPS resin composition according to the embodiment of the invention with the arithmetic mean waviness Wa controlled to be not greater than 3 μm is desirable, since this significantly reduces the occurrence of a flow mark or a sink mark on the surface of a molded product and ensures the sophisticated appearance of the molded product.

The melt crystallization temperature Tmc according to the embodiment of the invention is a measured temperature in a nitrogen atmosphere under the following measurement conditions with regard to about 10 mg of pellets, which are obtained by melt-kneading the PPS resin composition according to the embodiment of the invention and drying the melt-kneaded composition under atmospheric pressure at 120° C. for 8 hours, are pre-dried at 130° C. for 3 hours and are subsequently placed in a measurement machine DSC-7 manufactured by PerkinElmer, Inc. In the PPS resin composition according to the embodiment of the invention, the melt crystallization temperature Tmc is not lower than 225° C., is preferably not lower than 230° C. and is more preferably not lower than 235° C. The PPS resin composition according to the embodiment of the invention with the melt crystallization temperature Tmc controlled to be not lower than 225° C. is desirable, since this facilitates high crystallization on the surface layer of a molded product, suppresses the uneven distribution of the filler on the surface layer of the molded product and reduces the waviness of the molten resin in the flow direction, thus improving the mold transfer property.

Measurement Conditions:
(a) keep at 50° C. for 1 minute;
(b) raise temperature from 50° C. to 340° C. (temperature rise rate of 20° C./minute);
(c) keep at 340° C. for 1 minute; and
(d) decrease temperature from 340° C. to 100° C. (temperature decrease rate of 20° C./minute).

(The peak temperature of an endothermic peak during crystallization by melting and cooling is specified as the melt crystallization temperature.)

[PPS Resin Composition Obtained by Further Mixing Component (E) in Addition to Component (A) and Component (B)]

When the PPS resin composition according to the embodiment of the invention further includes the component (E) in addition to the components (A) and (B), the mixing ratio of the component (A) is to be selected in the range of 5 to 95% by weight when the total of the component (A) and the component (B) is equal to 100% by weight. Specifically, in order to significantly improve the mold deposit, the heat resistance and the appearance of a molded product of the PPS resin composition according to the embodiment of the invention, the mixing ratio of the component (A) is preferably selected in the range of 5 to 20% by weight, when the total of the component (A) and the component (B) is equal to 100% by weight. In order to significantly improve the toughness of the PPS resin composition according to the embodiment of the invention, the mixing ratio of the component (A) is preferably selected in the range of 80 to 95% by weight, when the total of the component (A) and the component (B) is equal to 100% by weight. The mixing ratio of the component (B) of less than 5% by weight slows cooling and solidification of the molten resin the mold and drastically increases the waviness of the molten resin in the flow direction, which may undesirably cause a flow mark or a sink mark on the surface of the molded product. The mixing ratio of the component (B) of greater than 95% by weight, on the other hand, does not have sufficient compatibility with the functional group-containing olefin copolymer (E) according to the embodiment of the invention, which may undesirably cause significant reduction in toughness.

According to the embodiment of the invention, in the case of addition of the functional group-containing olefin copolymer (E), the amount of the component (E) added is not less than 1 part by weight, preferably not less than 3 parts by weight and more preferably not less than 5 parts by weight relative to the total of 100 parts by weight of the component (A) and the component (B). The amount of the component (E) added is also not greater than 70 parts by weight, preferably not greater than 50 parts by weight and more preferably not greater than 25 parts by weight. Addition of the amount of the functional group-containing olefin copolymer (E) of greater than 70 parts by weight significantly deteriorates the melt residence stability. Addition of less than 1 part by weight is unlikely to achieve the excellent effect of improvement in toughness.

The polyphenylene sulfide resin composition according to the embodiment of the invention may further include 1 to 70 parts by weight of the olefin copolymer without containing functional group (F), relative to the total of 100 parts by weight of the component (A), the component (B) and the component (E) described above.

The amount of addition of the olefin copolymer without containing functional group (F) according to the embodiment of the invention is not less than 1 part by weight, preferably not less than 3 parts by weight and more preferably not less than 10 parts by weight relative to the total of 100 parts by weight of the component (A), the component (B) and the component (E). The amount of the component (F) added is also not greater than 70 parts by weight, preferably not greater than 60 parts by weight and more preferably not greater than 40 parts by weight. Addition of the amount of the olefin copolymer without containing functional group (F) of not less than 1 part by weight is likely to have the effect of improvement in toughness especially at low temperature. Addition of not greater than 70 parts by weight has the good compatibility with the epoxy group-containing olefin resin and improves the toughness.

In the PPS resin composition according to the embodiment of the invention, addition of the component (E) to the component (A) and the component (B) or further addition of the component (F) enables the high rigidity to be provided by mixing the PPS resins having specific outgas amounts with no addition of any inorganic filler. This accordingly ensures the good molding processability without deteriorating the high toughness which the olefin copolymer intrinsically has. Addition of the functional group-containing olefin polymer (E) to the resin composition obtained by mixing the polyphenylene sulfide resin (A) having the weight loss percentage ΔWr of greater than 0.18% with the polyphenylene sulfide resin (B) having the weight loss percentage ΔWr of not greater than 0.18% improves the toughness and the rigidity. Further addition of the olefin copolymer without containing functional group (F) achieves further improvement of the toughness. These reasons are, however, so far not elucidated. It is, however, presumed that the synergy effects of the improvement in compatibility with the component (E) by addition of the component (A) and the high crystallinity of a molded product by addition of the component (B) ensure the excellent toughness which the component (E) and the component (F) intrinsically have and satisfy both the high toughness and the high rigidity at the high level.

In order to achieve such properties, it is preferable to form the following morphology (phase structure).

(1) In the morphology of the PPS resin composition comprised of the component (A), the component (B) and the component (E), it is preferable that the PPS resin forms the sea phase (continuous phase or matrix) and the functional group-containing olefin copolymer (E) forms the dispersed phases (island phases). Additionally, the functional group-containing olefin copolymer (E) has the number-average dispersed particle diameter of preferably not less than 1 nm, more preferably not less than 10 nm and furthermore preferably not less than 50 nm. The above number-average dispersed particle diameter is preferably not less than 500 nm, is more preferably not less than 400 nm and is furthermore preferably not less than 300 nm. When the number-average dispersed particle diameter is in the above preferable range, the high toughness of the functional group-containing olefin resin exerts the effect of improvement in toughness of the PPS resin composition and allows for high-volume production.

(2) In the morphology of the PPS resin composition comprised of the component (A), the component (B), the component (E) and the component (F), it is preferable that the PPS resin forms the sea phase (continuous phase or matrix) and the olefin copolymer comprised of the component (E) and the component (F) forms the dispersed phases (island phases). Additionally, the olefin copolymer comprised of the component (E) and the component (F) has the number-average dispersed particle diameter of preferably not less than 1 nm, more preferably not less than 10 nm and furthermore preferably not less than 50 nm. The above number-average dispersed particle diameter is preferably not less than 500 nm, is more preferably not less than 400 nm and is furthermore preferably not less than 300 nm. When the number-average dispersed particle diameter is in the above preferable range, the high toughness of the functional group-containing olefin resin exerts the effect of improvement in toughness of the PPS resin composition and allows for high-volume production.

The number-average dispersed particle diameter herein is a value measured by the following procedure. An ASTM No. 1 dumbbell test piece is molded at the molding temperature of melting peak temperature of the PPS resin+20° C. A thin piece of not greater than 0.1 μm is cut at −20° C. from the center area in the cross sectional direction of the dumbbell test piece and is observed at 10 thousand-fold magnification using a transmission electron microscope H-7100 manufactured by Hitachi, Ltd. (resolution (particle image): 0.38 nm, magnification: 500 to 600 thousand-fold). With regard to the dispersed phases of the functional group-containing olefin copolymer (E) or the dispersed phases of the olefin copolymer comprised of the component (E) and the component (F), the maximum diameter and the minimum diameter are measured for each of any 100 particles observed, and their mean value is specified as dispersed particle diameter of the particle. The mean value of the dispersed particle diameters is then specified as the number-average dispersed particle diameter.

The PPS resin composition according to the embodiment of the invention significantly reduces the waviness of the molten resin in the flow direction in the mold, which may lead to the occurrence of a flow mark or a sink mark on the surface of a molded product and accordingly ensures the sophisticated appearance of the molded product, compared with the conventional PPS resin composition including the olefin resin. In the PPS resin composition according to the embodiment of the invention, it is found that the waviness in the flow direction of the molten resin has clear correlations to the arithmetic mean waviness Wa and the melt crystallization temperature Tmc.

The arithmetic mean waviness Wa according to the embodiment of the invention is a numerical value measured in conformity with JIS B0601 using an ASTM No. 1 dumbbell test piece obtained from the PPS resin composition. In the PPS resin composition according to the embodiment of the invention, the arithmetic mean waviness Wa is not greater than 3.0 μm, is preferably not greater than 2 μm and is more preferably not greater than 1.5 μm. The PPS resin composition according to the embodiment of the invention with the arithmetic mean waviness Wa controlled to be not greater than 3 μm is desirable, since this significantly reduces the occurrence of a flow mark or a sink mark on the surface of a molded product and ensures the sophisticated appearance of the molded product.

The melt crystallization temperature Tmc according to the embodiment of the invention is a measured temperature in a nitrogen atmosphere under the following measurement conditions with regard to about 10 mg of pellets, which are obtained by melt-kneading the PPS resin composition according to the embodiment of the invention and drying the melt-kneaded composition under atmospheric pressure at 120° C. for 8 hours, are pre-dried at 130° C. for 3 hours and are subsequently placed in a measurement machine DSC-7 manufactured by PerkinElmer, Inc. In the PPS resin composition according to the embodiment of the invention, the melt crystallization temperature Tmc is not lower than 225° C., is preferably not lower than 230° C. and is more preferably not lower than 235° C. The PPS resin composition according to the embodiment of the invention with the melt crystallization temperature Tmc controlled to be not lower than 225° C. is desirable, since this facilitates high crystallization on the surface layer of a molded product, reduces the waviness of the molten resin in the flow direction in the mold, thus improving the mold transfer property.

Measurement Conditions:
(a) keep at 50° C. for 1 minute;
(b) raise temperature from 50° C. to 340° C. (temperature rise rate of 20° C./minute);
(c) keep at 340° C. for 1 minute; and
(d) decrease temperature from 340° C. to 100° C. (temperature decrease rate of 20° C./minute).
(The peak temperature of an endothermic peak during crystallization by melting and cooling is specified as the melt crystallization temperature.)

The PPS resin composition according to the embodiment of the invention is generally produced by melt kneading. A typical procedure may feed the raw materials to a generally known melt kneading machine such as a single-screw extruder, a twin-screw extruder, a Banbury mixer, a kneader, or a mixing roll and melt-kneads the fed raw materials at the processing temperature of the melting peak temperature of the PPS resin+5 to 100° C. The mixing order of the raw materials is not specifically limited. Any of the following methods may be employed: a procedure of mixing all the raw materials and melt kneading the mixture by the above method; a procedure of mixing part of the raw materials, melt kneading the partial mixture by the above method, adding the remaining raw materials and further melt kneading the resulting mixture; and a procedure of mixing part of the raw materials and subsequently adding the remaining raw materials using a side feeder during melt kneading of the partial mixture with the single-screw extruder or the twin-screw extruder. With respect to small amounts of additive components, an available procedure may melt-knead and pelletize the other components by the above method or another suitable method, subsequently add these additive components prior to molding and then mold the resulting mixture.

The composition according to the embodiment of the invention may be produced by a procedure other than melt kneading. For example, an available technique compresses and compacts the composition in the solid state to the form of pills and molds the pills by, for example, injection molding.

According to the embodiment of the invention, in order to maintain the high heat resistance and high thermal stability, it is preferable to add one or more antioxidant selected among phenolic compounds and phosphorus components relative to the total of 100 parts by weight of the resin composition. In terms of the effect of improvement in heat resistance, the amount of such an antioxidant added is preferably not less than 0.01 parts by weight or more specifically not less than 0.02 parts by weight relative to the total of 100 parts by weight of the component (A) and the component (B). In terms of the gas component produced during molding, on the other hand, the amount of the antioxidant added is preferably not greater than 5 parts by weight or more specifically not greater than 1 part by weight relative to the total of 100 parts by weight of the component (A) and the component (B). The combined use of a phenolic antioxidant and a phosphorus antioxidant preferably has the especially significant effects of maintaining the heat resistance and the thermal stability.

Hindered phenolic compounds are preferably used as the phenolic antioxidant. Concrete examples include triethylene glycol bis[3-t-butyl-(5-methyl-4-hydroxyphenyl)propionate], N,N'-hexamethylene-bis(3,5-di-t-butyl-4-hydroxyhydrocinnamamide), tetrakis[methylene-3-(3',5'-di-t-butyl-4'-hydroxyphenyl)propionate]methane, pentaerythrityl tetrakis[3-(3',5'-di-t-butyl-4'-hydroxyphenyl)propionate], 1,3,5-tris(3,5-di-t-butyl-4-hydroxybenzyl)-s-triazine-2,4,6-(1H,3H,5H)-trion, 1,1,3-tris(2-methyl-4-hydroxy-5-t-butylphenyl)butane, 4,4'-butylidenbis(3-methyl-6-t-butylphenol), n-octadecyl-3-(3,5-di-t-butyl-4-hydroxyphenyl) propionate, 3,9-bis[2-(3-(3-t-butyl-4-hydroxy-5-methylphenyl)propionyloxy)-1,1-dimethyl ethyl]-2,4,8,10-tetraoxaspiro[5,5]undecane and 1,3,5-trimethyl-2,4,6-tris-(3,5-di-t-butyl-4 hydroxybenzyl)benzene.

Among them, especially preferable are ester-based polymeric hindered phenolic antioxidants. More specifically, for example, tetrakis[methylene-3-(3',5'-di-t-butyl-4'-hydroxyphenyl)propionate]methane, pentaerythrityl tetrakis[3-(3', 5'-di-t-butyl-4'-hydroxyphenyl)propionate] and 3,9-bis[2-(3-(3-t-butyl-4-hydroxy-5-methylphenyl)propionyloxy)-1,1-dimethyl ethyl]-2,4,8,10-tetraoxaspiro[5,5]undecane are preferably used.

Available examples of the phosphorus antioxidant include bis(2,6-di-t-butyl-4-methylphenyl)pentaerythritol diphosphite, bis(2,4-di-t-butylphenyl)pentaerythritol diphosphite, bis(2,4-di-cumylphenyl)pentaerythritol diphosphite, tris(2,4-di-t-butylphenyl)phosphite, tetrakis(2,4-di-t-butylphenyl)-4,4'-bisphenylene phosphite, distearyl pentaerythritol diphosphite, triphenyl phosphite and diethyl 3,5-di-butyl-4-hydroxybenzyl phosphonate.

Among them, antioxidants having the high melting point are preferable, in order to reduce vaporization and degradation of the antioxidant in the PPS resin compound. More specifically, for example, bis(2,6-di-t-butyl-4-methylphenyl) pentaerythritol diphosphite, bis(2,4-di-t-butylphenyl)pentaerythritol diphosphite and bis(2,4-di-cumylphenyl)pentaerythritol diphosphite are preferably used.

According to the embodiment of the invention, a flame retardant may be added to improve the flame resistance of the PPS resin composition. Available examples of the flame retardant include hydrated metal flame retardants such as aluminum hydroxide and magnesium hydroxide, brominated flame retardants, chlorinated flame retardants, phosphorus-based flame retardants and inorganic flame retardants such as antimony trioxide.

The phosphorus-based flame retardant is not specifically limited but may be any of phosphorus atom-containing compounds, for example, red phosphorus and organic phosphorus compounds. Examples of the organic phosphorus compound include phosphate esters, phosphonic acid and its derivatives (including salts), phosphinic acid and its derivatives (including salts), phosphine, phosphine oxide, biphosphine, phosphonium salts, phosphazene, phosphaphenanthrene derivatives and inorganic phosphates.

The content of such flame retardant component is selected to be not greater than 50% by weight of the entire resin composition, preferably not greater than 30% by weight and more preferably not greater than 20% by weight.

According to the embodiment of the invention, in order to improve the wear resistance of the PPS resin composition, a fluorine resin such as polytetrafluoroethylene or ethylene-tetrafluoroethylene or silicone oil may be added. The added amount of this additive is generally selected to be in the range of 0.1 to 10% by weight of the entire resin composition.

The following resin may be added to and mixed with the PPS resin composition according to the embodiment of the invention in such a range that does not deteriorate the advantageous effects of the invention. Concrete examples include: olefin polymers and copolymers without containing epoxy group such as polyamide resins, polybutylene terephthalate resins, polyethylene terephthalate resins, modified polyphenylene ether resins, polysulfone resins, polyarylsulfone resins, polyketone resins, polyarylate resins, liquid crystal polymers, polyether ketone resins, polythioether ketone resins, polyether ether ketone resins, polyimide resins, polyether imide resins, polyether sulfone resins, polyamide imide resins, polyethylene tetrafluoride resins, and ethylene 1-butene copolymers; and novolac epoxy resins.

The novolac epoxy resins have two or more epoxy groups and are generally obtained by reaction of novolac phenolic resins with epichlorohydrin. The novolac phenolic resins are obtained by condensation reaction of phenols and formaldehyde. The phenol as the raw material is not specifically limited, and available examples include phenol, o-cresol, m-cresol, p-cresol, bisphenol A, resorcinol, p-tert-butylphenol, bisphenol F, bisphenol S and their condensates.

The following compounds may be added for the purpose of modification: plasticizers such as polyalkylene oxide oligomer-based compounds, thioether-based compounds, ester-based compounds and organophosphorus-based compounds; crystal nucleating agents such organophosphorus compounds and polyether ether ketone; mold release agents such as montanic acid waxes, metal soaps like lithium stearate and aluminum stearate, ethylene diamine-stearic acid-sebacic acid polycondensates and silicone-based compounds; coloring inhibitors such as hypophosphites; phenolic antioxidants such as 3,9-bis[2-(3-(3-t-butyl-4-hydroxy-5-methylphenyl) propionyloxy)-1,1-dimethyl ethyl]-2,4,8,10-tetraoxaspiro[5, 5]undecane; phosphorus antioxidants such as bis(2,4-di-cumylphenyl)pentaerythritol diphosphite, as well as conventional additives including water, lubricants, ultraviolet absorbers, coloring agents and foaming agents. Any of the above compounds exceeding 20% by weight of the entire composition deteriorates the intrinsic properties of the PPS resin and is thus undesirable. The added amount is accordingly not greater than 10% by weight and is more preferably not greater than 1% by weight.

The PPS resin composition according to the embodiment of the invention has excellent properties, i.e., molding processability, heat resistance, low gas emission, flame resistance, chemical resistance, mechanical properties and the electrical properties and is used to produce various molded products by injection molding, injection compression molding, blow molding or extrusion molding. Exemplary applications of the molded product made of the PPS resin composition according to the embodiment of the invention include: electric and electronic components such as sensors, LED lamps, connectors, sockets, resistors, relay cases, switches, coil bobbins, capacitors, variable capacitor cases, optical pickups, oscillators, various terminal boards, transformers, plugs, printed circuit boards, tuners, speakers, microphones, headphones, small motors, magnetic head bases, power modules, semiconductors, liquid crystals, FDD carriages, FDD chasses, motor brush holders, parabola antennas, and computer-related components; domestic and office electric appliance components such as VTR components, TV set components, irons, irons, hair dryers, rice cooker components, microwave oven components, acoustic components, audio visual equipment components for audio/laserdiscs (registered trademark), compact discs and digital video discs, lighting components, refrigerator components, air conditioner components, typewriter components and word processor components; office computer-related components, telephone-related components, facsimile-related components, copy machine-related components, cleaning jigs, motor components, and machine components for lighters and typewriters; optical equipment and precision machine components, such as microscopes, binoculars, cameras and watches; plumbing components such as packings for faucets, combination faucets, pump components, pipe joints, water flow control valves, relief valves, water temperature sensors, water flow sensors and water meter housings; automobile and vehicle-related components such as valve alternator terminals, alternator connectors, IC regulators, potentiometer bases for light dimmers, various valves including emission valves, various pipes for fuel, exhaust system, and air intake system, air intake nozzle snorkels, intake manifolds, fuel pumps, engine coolant joints, carburetor main bodies, carburetor spacers, emission sensors, coolant sensors, oil temperature sensors, throttle position sensors, crankshaft position sensors, air flowmeters, brake pad wear sensors, thermostat bases for air conditioners, hot air flow control valves, brush holders for radiator motors, water pump impellers, turbine vanes, windshield wiper motor-related components, distributors, starter switches, starter relays, transmission wire harnesses, windshield washer fluid nozzles, air conditioner panel switch plates, fuel solenoid valve coils, fuse connectors, horn terminals, electric component insulators, step motor rotors, lamp sockets, lamp reflectors, lamp housings, brake pistons, solenoid bobbins, engine oil filters, fuel tanks, ignition cases, vehicle speed sensors and cable liners; and other various applications.

EXAMPLES

The following more specifically describes the embodiments of the invention with reference to Examples, but the invention is not limited to the following Examples. In Examples described below, the material properties were evaluated by the following methods.

<Measurement of Molecular Weight>

The molecular weights of polyphenylene sulfide and the polyphenylene sulfide prepolymer were measured by gel permeation chromatography (GPC) as one type of size exclusion chromatography (SEC) and were calculated as polystyrene equivalents. The measurement conditions of GPC are given below.

Apparatus: SSC-7100 manufactured by Senshu Scientific Co., Ltd.
Column: GPC3506 manufactured by Senshu Scientific Co., Ltd.
Eluent: 1-chloronaphthalene
Detector: differential refractive index detector
Column temperature: 210° C.
Pre-thermostatic bath temperature: 250° C.
Pump thermostatic bath temperature: 50° C.
Detector temperature: 210° C.
Flow rate: 1.0 mL/min
Sample injection volume: 300 μL (sample concentration: about 0.2% by weight)

<Measurement of Weight Loss Percentage Under Heating of PPS Resin>

The weight loss percentage of polyphenylene sulfide under heating was measured under the following conditions using a thermogravimetric analyzer. The sample was fine particles of 2 mm or smaller size.

Apparatus: TGA7 manufactured by PerkinElmer, Inc.
Atmosphere for measurement: under nitrogen stream
Weight of fed sample: about 10 mg
Measurement conditions:
(a) keep at the programmed temperature of 50° C. for 1 minute; and
(b) raise temperature from the programmed temperature of 50° C. to 400° C. with temperature rise rate of 20° C./minute. The weight loss percentage $\Delta Wr$ was calculated by the following Equation (3) from a sample weight (W2) at 330° C. based on a sample weight (W1) at 100° C. during the temperature rise of (b):

$$\Delta Wr=(W1-W2)/W1\times100\% \qquad (3)$$

In Examples described below, $\Delta Wr300$ representing the weight loss percentage at 300° C. based on the sample weight at 100° C., $\Delta Wr320$ representing the weight loss percentage at 320° C. based on the sample weight at 100° C. and $\Delta Wr340$ representing the weight loss percentage at 340° C. based on the sample weight at 100° C. are shown for the purpose of reference.

<Measurement of Alkali Metal Content in PPS Resin>

The alkali metal content contained in the polyphenylene sulfide resin was qualitatively determined by the following procedure:
(a) weigh the sample in a quartz crucible and incinerate the weighed sample in an electric oven;
(b) dissolve the ash in concentrated nitric acid and dilute the solution with dilute nitric acid to a fixed volume; and
(c) measure the alkali metal content in the obtained solution by ICP (Inductively Coupled Plasma) mass spectrometry (apparatus: 4500 manufactured by Agilent Technologies Co., Ltd.) and ICP (Inductively Coupled Plasma) atomic emission spectroscopy (apparatus: Optima 4300DV manufactured by PerkinElmer, Inc.)

<Analysis of Gas Component Produced by Heating PPS Resin>

The component produced by heating the polyphenylene sulfide resin was qualitatively determined by the following procedure. The sample was fine particles of 2 mm or smaller size.

(a) Collection of Outgas Under Heating

The procedure heated about 10 mg of the polyphenylene sulfide resin at 320° C. under nitrogen stream (50 ml/minute) for 60 minutes and collected the outgas component in a thermal desorption tube for gas collection Carbotrap 400.

(b) Analysis of Gas Component

The gas component collected in the above tube was subject to thermal desorption with a temperature rise of room temperature to 280° C. over 5 minutes using a thermal desorption unit Supelco TDU (manufactured by Sigma-Aldrich Corporation). The thermally desorbed component was subject to component separation by gas chromatography. The amount of γ-butyrolactone in the gas was measured as the amount of the lactone-based compound, and the amount of 4-chrolo-N-methylaniline was measured as the amount of the aniline-based compound.

[Injection Molding of Heat Sag Test Piece]

A heat sag test piece of 130 mm (length)×12.7 mm (width)×1 mm (thickness) was molded under the conditions of the resin temperature of 320° C. and the mold temperature of 130° C. using an injection molding machine Promat 40/20 manufactured by Sumitomo Heavy Industries, Ltd.

[Heat Sag Amount]

While being held at a length of 30 mm from one end and fixed horizontally in a cantilevered state, the injection-molded heat sag test piece described above was treated in a hot air gear oven at 190° C. for 15 hours. The sag from the horizontal state by the dead weight at the opposite end of the test piece that was opposite to the cantilevered end was then measured as a heat sag amount. The smaller heat sag amount indicates the higher thin-wall heat resistance.

[Bar Flow Length]

A molded piece of 150 mm (length)×12.6 mm (width)×0.5 mm (thickness) (gate position: width side of molded piece, gate shape: film gate) was injection molded continually ten times under the conditions of the resin temperature of 320° C., the mold temperature of 130° C., the injection rate set to 99% and the injection pressure set to 45% (observed injection pressure: 98 MPa) using an injection molding machine Promat 40/20 manufactured by Sumitomo Heavy Industries, Ltd. The length of each molded piece in the longitudinal direction from the gate position to the filling end was measured, and its mean value was specified as the bar flow length. The greater value of the bar flow length indicates the better thin-wall flowability.

<Injection Molding of Tensile Test Piece>

An ASTM No. 1 dumbbell test piece was molded under the conditions of the resin temperature of 320° C. and the mold temperature of 130° C. using an injection molding machine SE75-DUZ manufactured by Sumitomo Heavy Industries, Ltd.

<Tensile Test>

The tensile strength and the tensile elongation of the above injection-molded ASTM No. 1 dumbbell test piece were measured in conformity with ASTM D638 under the conditions of the span of 114 mm and the tension rate of 10 mm/min using a tension tester Tensilon UTA2.5T. The greater values indicate the better tensile properties.

<Injection Molding of Flexural Test Piece>

A flexural test piece of 12.5 mm (width)×130 mm (length)×3.2 mm (thickness) was molded under the conditions of the resin temperature of 320° C. and the mold temperature of 130° C. using the injection molding machine SE75-DUZ manufactured by Sumitomo Heavy Industries, Ltd.

<Flexural Test>

The flexural strength and the flexural modulus of the above injection-molded flexural test piece were measured in conformity with ASTM D790 under the conditions of the span of 100 mm and the cross-head speed of 1.0 mm/min using a flexural tester Tensilon RTMIT. The greater values indicate the better flexural properties.

<Measurement of Deflection Temperature Under Load>

The deflection temperature under the load of 0.46 MPa of the above injection-molded flexural test piece was measured in conformity with ASTM D648. The greater value indicates the better heat resistance.

<Injection Molding of Impact Test Piece.

A mold notched Izod impact test piece of 12.7 mm (width)×60 mm (length)×3.2 mm (thickness) was molded under the conditions of the resin temperature of 320° C. and the mold temperature of 130° C. using the injection molding machine SE75-DUZ manufactured by Sumitomo Heavy Industries, Ltd.

<Izod Impact Test>

The notched Izod impact strength of the above injection-molded mold notched Izod impact test piece was measured in conformity with ASTM D256. The greater value indicates the better impact property.

<−20° C. Izod Impact Test>

After the above injection-molded mold notched Izod impact test piece was cooled down in an ultracold thermostatic bath for 120 minutes, the notched Izod impact strength was measured in conformity with ASTM D256. The greater value indicates the material having the better toughness at low temperature.

<Measurement of Heating Loss of PPS Resin Composition/

PPS resin composition pellets obtained by melt kneading the composition and drying under atmospheric pressure at 120° C. for 8 hours were pre-dried at 130° C. for 3 hours, and about 10 g was precisely weighed in an aluminum cup. Heating loss $\Delta Wh$ was measured by heating treatment under the atmospheric pressure at 320° C. for 2 hours. The heating loss $\Delta Wh$ was calculated by the following Equation (4) from a sample weight (W4) after heating treatment based on a sample weight (W3) before heating:

$$\Delta Wh=(W3-W4)/W3\times 100 \qquad (4)$$

The smaller value of the above heating loss indicates the smaller outgas amount.

<Measurement of Center Line Waviness Ra>

The center line waviness Ra (in conformity with JIS B0601) was measured with no treatment and after heat treatment of the above injection-molded ASTM No. 1 dumbbell test piece. The heat treatment of this molded product was performed under the conditions of 180° C. for 15 hours using a hot air gear oven. The smaller value indicates the less uneven distribution of the filler on the surface layer of the molded product and thereby the better surface smoothness.

<Measurement of Arithmetic Mean Waviness Wa>

The arithmetic mean waviness Wa (in conformity with JIS B0601) was measured with no treatment and after heat treatment of the above injection-molded ASTM No. 1 dumbbell test piece. The heat treatment of this molded product was performed under the conditions of 180° C. for 15 hours using a hot air gear oven. The smaller value indicates the less occurrence of a flow mark or a sink mark on the surface of the molded product and thereby the better surface smoothness.

<Melt Crystallization Temperature>

The pellets of the PPS resin composition obtained by melt-kneading the composition and drying the melt-kneaded composition under atmospheric pressure at 120° C. for 8 hours were pre-dried at 130° C. for 3 hours. Subsequently, about 10 mg of the pellets were set in DSC-7 manufactured by PerkinElmer, Inc., and the melt crystallization temperature Tmc was measured in a nitrogen atmosphere under the following measurement conditions. The higher temperature facilitates cooling and solidification of the molten resin in the mold and thus indicates the better mold transfer property.

Measurement Conditions:

(a) kept at 50° C. for 1 minute;
(b) raised temperature from 50° C. to 340° C. (temperature rise rate of 20° C./minute);
(c) kept at 340° C. for 1 minute; and
(d) decreased temperature from 340° C. to 100° C. (temperature decrease rate of 20° C./minute).

(The peak temperature of an endothermic peak during crystallization by cooling after melting was specified as the melt crystallization temperature.)

<Measurement of Number-Average Dispersed Particle Diameter>

A center part of the above injection-molded ASTM No. 1 dumbbell test piece was cut in the direction orthogonal to the flow direction of the resin, and a thin piece of not greater than 0.1 μm was cut at −20° C. from the center area in the cross section. The cut thin piece was observed at 10 thousand-fold magnification using a transmission electron microscope H-7100 manufactured by Hitachi, Ltd. (resolution (particle image): 0.38 nm, magnification: 500 to 600 thousand-fold). With regard to each of any 100 observed particles of the olefin copolymer component, the maximum diameter and the minimum diameter were measured, and their mean value was specified as the dispersed particle diameter of the particle. Subsequently, the mean value of the dispersed particle diameter with regard to the above 100 particles of the olefin copolymer component was determined as the number-average dispersed particle diameter.

<Evaluation of Mold Deposit>

Using an injection molding machine SE75-DUZ manufactured by Sumitomo Heavy Industries, Ltd. in combination with a rectangular mold of 80 mm×80 mm×3 mm in thickness with a gas vent, continuous molding by full-automatic operation was performed under the conditions of the resin temperature of 320° C., the mold temperature of 130° C., the injection time of 15 s, the cooling time of 20 s and the molding cycle of 40 s, until accumulation of mold deposit on the gas vent. The state of accumulation of the mold deposit was visually checked after every 100 shots for evaluation of the mold deposit. The evaluation criteria of mold deposit were: "cross mark: significantly poor" on the occurrence of mold deposit before 500 shots; "triangle: poor" on the occurrence of mold deposit in 500 to 1000 shots; and "open circle: good" on no occurrence of mold deposit even after 1000 shots.

Reference Example 1

(A) Polymerization of Polyphenylene Sulfide Resin (A-1) Having Weight Loss Percentage ΔWr of Greater than 0.18% Under Heating The procedure fed 8.27 kg (70.00 mol) of 47.5% sodium hydrosulfide, 2.94 kg (70.63 mol) of sodium hydroxide 96%, 11.45 kg (115.50 mol) of N-methyl-2-pyrrolidone (NMP), 1.89 kg (23.1 mol) of sodium acetate and 5.50 kg of ion exchanged water in a 70-liter autoclave with an agitator and a bottom stop valve and gradually heated the mixture to 245° C. over about 3 hours at ordinary pressure under nitrogen stream. After 9.77 kg of water and 0.28 kg of NMP were distilled out, the reaction vessel was cooled down to 200° C. The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

After the reaction vessel was cooled down to 200° C., the procedure added 10.42 kg (70.86 mol) of p-dichlorobenzene and 9.37 kg (94.50 mol) of NMP, sealed the reaction vessel under nitrogen gas, raised the temperature from 200° C. to 270° C. at a rate of 0.6° C./minute with stirring at 240 rpm, and performed the reaction at 270° C. for 140 minutes. The procedure subsequently injected 2.40 kg of (133 mol) of water into the reaction vessel, while cooling down the reaction vessel from 270° C. to 250° C. over 15 minutes. After that, the procedure gradually cooled down the reaction vessel from 250° C. to 220° C. over 75 minutes, then rapidly cooled down to about room temperature and took the content out.

After diluting the content with about 35 liters of NMP to obtain slurry and stirring the slurry at 85° C. for 30 minutes, the procedure obtained a solid substance by filtration with a 80 wire mesh (aperture: 0.175 mm). The procedure then washed the obtained solid substance with about 35 liters of NMP and filtered. The procedure then repeated three times the operation of adding the obtained solid substance to 70 liters of ion exchanged water, stirring the mixture at 70° C. for 30 minutes and recovering the solid substance by filtration with the 80 wire mesh. The procedure subsequently added the obtained solid substance and 32 g of acetic acid to 70 liters of ion exchanged water, stirred the mixture at 70° C. for 30 minutes and filtered the mixture with the 80 wire mesh. The procedure further added the obtained solid substance to 70 liters of ion exchanged water, stirred the mixture at 70° C. for 30 minutes and recovered the solid substance by filtration with the 80 wire mesh. The procedure dried the resulting solid substance at 120° C. under nitrogen stream to obtain dry PPS resin (PPS resin (A-1)).

The resulting dry PPS resin was completely dissolved in 1-chloronaphthalene at 210° C. As the result of GPC measurement of the resulting dry PPS resin, the weight-average molecular weight was 50000, and the degree of dispersion was 2.66. As the result of measurement of the weight loss percentage of the resulting dry PPS under heating, ΔWr was 0.23%; ΔWr300(%)=0.18, ΔWr320(%)=0.21 and ΔWr340(%)=0.25. As the result of quantitative determination of the alkali metal content of the resulting dry PPS, the Na content was 120 ppm as the weight ratio, while no other alkali metals were detected. As the result of analysis of the outgas component of the resulting dry PPS under heating, 1190 ppm of γ-butyrolactone and 240 ppm of 4-chloro-N-methylaniline were detected relative to the weight of the product before heating.

Reference Example 2

(A) Polymerization of Polyphenylene Sulfide Resin (A-2) Having Weight Loss Percentage ΔWr of Greater than 0.18% Under Heating The procedure fed 8.27 kg (70.00 mol) of 47.5% sodium hydrosulfide, 2.94 kg (70.63 mol) of sodium hydroxide 96%, 11.45 kg (115.50 mol) of N-methyl-2-pyrrolidone (NMP), 2.24 kg (27.3 mol) of sodium acetate and 5.50 kg of ion exchanged water in a 70-liter autoclave with an agitator and a bottom stop valve and gradually heated the mixture to 245° C. over about 3 hours at ordinary pressure under nitrogen stream. After 9.77 kg of water and 0.28 kg of NMP were distilled out, the reaction vessel was cooled down to 200° C. The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

After the reaction vessel was cooled down to 200° C., the procedure added 10.32 kg (70.20 mol) of p-dichlorobenzene and 9.37 kg (94.50 mol) of NMP, sealed the reaction vessel under nitrogen gas, raised the temperature from 200° C. to 235° C. at a rate of 0.8° C./minute with stirring at 240 rpm, and performed the reaction at 235° C. for 40 minutes. After further raising the temperature to 270° C./minute at a rate of 0.8° C./minute and performing the reaction at 270° C. for 70 minutes, the procedure subsequently injected 2.40 kg of (133 mol) of water into the reaction vessel while cooling down the reaction vessel from 270° C. to 250° C. over 15 minutes. After that, the procedure gradually cooled down the reaction vessel from 250° C. to 220° C. over 75 minutes, then rapidly cooled down to about room temperature and took the content out.

After diluting the content with about 35 liters of NMP to obtain slurry and stirring the slurry at 85° C. for 30 minutes, the procedure obtained a solid substance by filtration with a 80 wire mesh (aperture: 0.175 mm). The procedure then washed the obtained solid substance with about 35 liters of NMP and filtered. The procedure then repeated three times the operation of adding the obtained solid substance to 70 liters of ion exchanged water, stirring the mixture at 70° C. for 30 minutes and recovering the solid substance by filtration with the 80 wire mesh. The procedure subsequently added the obtained solid substance and 32 g of acetic acid to 70 liters of ion exchanged water, stirred the mixture at 70° C. for 30 minutes and filtered the mixture with the 80 wire mesh. The procedure further added the obtained solid substance to 70 liters of ion exchanged water, stirred the mixture at 70° C. for 30 minutes and recovered the solid substance by filtration with the 80 wire mesh. The procedure dried the resulting solid substance at 120° C. under nitrogen stream to obtain dry PPS resin (PPS resin (A-2)).

The resulting dry PPS resin was completely dissolved in 1-chloronaphthalene at 210° C. As the result of GPC measurement of the resulting dry PPS resin, the weight-average molecular weight was 70000, and the degree of dispersion was 2.60. As the result of measurement of the weight loss percentage of the resulting dry PPS under heating, $\Delta Wr$ was 0.21%; $\Delta Wr300(\%)=0.13$, $\Delta Wr320(\%)=0.19$ and $\Delta Wr340(\%)=0.23$. As the result of quantitative determination of the alkali metal content of the resulting dry PPS, the Na content was 50 ppm as the weight ratio, while no other alkali metals were detected. As the result of analysis of the outgas component of the resulting dry PPS under heating, 920 ppm of γ-butyrolactone and 310 ppm of 4-chloro-N-methylaniline were detected relative to the weight of the product before heating.

Reference Example 3

(A) Polymerization of Polyphenylene Sulfide Resin (A-3) Having Weight Loss Percentage $\Delta Wr$ of Greater than 0.18% Under Heating The procedure fed 8.27 kg (70.00 mol) of 47.5% sodium hydrosulfide, 2.91 kg (69.80 mol) of sodium hydroxide 96%, 11.45 kg (115.50 mol) of N-methyl-2-pyrrolidone (NMP) and 10.5 kg of ion exchanged water in a 70-liter autoclave with an agitator and a bottom stop valve and gradually heated the mixture to 245° C. over about 3 hours at ordinary pressure under nitrogen stream. After 14.78 kg of water and 0.28 kg of NMP were distilled out, the reaction vessel was cooled down to 200° C. The remaining amount of water in the system per 1 mol of the fed alkali metal sulfide was 1.06 mol including the water content consumed for hydrolysis of NMP. The release amount of hydrogen sulfide was 0.02 mol per 1 mol of the fed alkali metal sulfide.

After cooling down the reaction vessel to 200° C., the procedure added 10.48 kg (71.27 mol) of p-dichlorobenzene and 9.37 kg (94.50 mol) of NMP, sealed the reaction vessel under nitrogen gas and raised the temperature from 200° C. to 270° C. at a rate of 0.6° C./minute with stirring at 240 rpm. After the reaction at 270° C. for 100 minutes, the procedure opened the bottom stop valve of the autoclave, flushed the content to a vessel with an agitator over 15 minutes under pressure of nitrogen and stirred the flushed content at 250° for some time to remove a most part of NMP.

The procedure placed the obtained solid substance and 76 liters of ion exchanged water in an autoclave with an agitator, washed at 70° C. for 30 minutes, and performed suction filtration with a glass filter. The procedure subsequently poured 76 liters of ion exchanged water heated to 70° C. onto the glass filter and obtained cake by suction filtration. The procedure placed the obtained cake and 90 liters of ion exchanged water in an autoclave with an agitator and added acetic acid to control pH to 7. The procedure substituted the inside of the autoclave with nitrogen and subsequently raised the temperature to 192° C. and kept the temperature for 30 minutes. The procedure then cooled down the autoclave and took the content out. After the content was subject to suction filtration with a glass filter, the procedure poured 76 liters of ion exchanged water at 70° C. onto the glass filter and obtained cake by suction filtration. Dry PPS resin (PPS resin (A-3)) was obtained by drying the obtained cake at 120° C. under nitrogen stream.

The resulting dry PPS resin was completely dissolved in 1-chloronaphthalene at 210° C. As the result of GPC measurement of the resulting dry PPS resin, the weight-average molecular weight was 20000, and the degree of dispersion was 3.10. As the result of measurement of the weight loss percentage of the resulting dry PPS under heating, $\Delta Wr$ was 0.53%; $\Delta Wr300(\%)=0.48$, $\Delta Wr320(\%)=0.50$ and $\Delta Wr340(\%)=0.55$. As the result of quantitative determination of the alkali metal content of the resulting dry PPS, the Na content was 976 ppm as the weight ratio, while no other alkali metals were detected. As the result of analysis of the outgas component of the resulting dry PPS under heating, 2650 ppm of γ-butyrolactone and 45 ppm of 4-chloro-N-methylaniline were detected relative to the weight of the product before heating.

Reference Example 4

(B) Polymerization of Polyphenylene Sulfide Resin (B-1) Having Weight Loss Percentage $\Delta Wr$ of not Greater than 0.18% Under Heating The procedure fed 1.648 kg of a 48% by weight of sodium hydrosulfide aqueous solution (sodium hydrosulfide: 0.791 kg (14.1 mol)), 1.225 kg of a 48% by weight of sodium hydroxide aqueous solution (sodium hydroxide: 0.588 kg (14.7 mol)), 35 liters of N-methyl-2-pyrrolidone (NMP) and 2.120 kg (14.4 mol) of p-dichlorobenzene (p-DCB) in an autoclave with an agitator and an upper bleeder valve.

The procedure sealed the reaction vessel at room temperature and ordinary pressure under nitrogen gas and subsequently raised the temperature from room temperature to 200° C. over 25 minutes with stirring at 400 rpm. The procedure subsequently raised the temperature to 250° C. over 35 minutes and performed the reaction at 250° C. for 2 hours. The procedure gradually opened the bleeder valve while keeping the internal temperature at 250° C. and distilled out 26.6 kg of the solvent over 40 minutes. After completion of the distillation of the solvent, the procedure cooled down the autoclave to about room temperature and took the content out.

The recovered content was heated with stirring under nitrogen to the temperature of the reaction solution to 100° C. After keeping at 100° C. for 20 minutes, the reactant was subject to solid-liquid separation using a stainless steel wire mesh having the average aperture of 10 μm. The procedure dropped the obtained filtrate component into about triple volume of methanol and recovered the deposit content. The procedure repeated three times the operation of slurrying the solid component recovered after deposition with about 2.5 L of 80° C. warm water, stirring the slurry at 80° C. for 30 minutes and filtering the slurry and subsequently dried the obtained solid substance under reduced pressure at 80° C. for 8 hours, so as to obtain a dried solid. As the result of analysis of the obtained dried solid by infrared absorption spectroscopy and high-performance liquid chromatography, the obtained dried solid contained 85% b weight of cyclic polyphenylene sulfide.

The procedure placed the obtained dried solid in a glass test tube with a distillation pipe and an agitating blade and subsequently repeated depressurization of the test tube and nitrogen substitution three times. The procedure controlled the temperature to 340° C. with keeping the inside of the test tube at about 0.1 kPa, heated the test tube at 340° C. for 120 minutes and cooled down the test tube to room temperature to obtain a polymer. The obtained product was identified as polyphenylene sulfide by infrared spectroscopy. GPC measurement showed that the obtained product had the weight-average molecular weight of about 50 thousand and the degree of dispersion of 2.35. As the result of measurement of the weight loss percentage of the obtained product under heating, $\Delta$Wr was 0.055%; $\Delta$Wr300(%)=0.035, $\Delta$Wr320(%) =0.044 and $\Delta$Wr340(%)=0.060. As the result of quantitative determination of the alkali metal content of the obtained product, the Na content was 70 ppm as the weight ratio, while no other alkali metals were detected. As the result of analysis of the outgas component of the obtained product under heating, both the lactone-based compound and the aniline-based compound were below the measurable limits. The above obtained product was called PPS resin (B-1).

Reference Example 5

(B) Polymerization of Polyphenylene Sulfide Resin (B-2) Having Weight Loss Percentage $\Delta$Wr of not Greater than 0.18% Under Heating Reference Example 5 performed the same procedure as that of Reference Example 4 except that the fed amount of p-dichlorobenzene was changed to 2.278 kg (15.5 mol). As the result of analysis, the obtained dried solid contained 72% of cyclic polyphenylene sulfide. The polymer had the weight-average molecular weight of about 20 thousand and the degree of dispersion of 1.90. As the result of measurement of the weight loss percentage of the obtained product under heating, $\Delta$Wr was 0.065%; $\Delta$Wr300(%)=0.045, $\Delta$Wr320(%) =0.055 and $\Delta$Wr340(%)=0.070. As the result of quantitative determination of the alkali metal content of the obtained product, the Na content was 280 ppm as the weight ratio, while no other alkali metals were detected. As the result of analysis of the outgas component of the obtained product under heating, 24 ppm of γ-butyrolactone and 19 ppm of 4-chloro-N-methylaniline were detected relative to the weight of the product before heating. The above obtained product was called PPS resin (B-2).

Reference Example 6

(C) Fibrous and/or Non-Fibrous Filler (C-1)

Glass fiber (T747 manufactured by Asahi Fiber Glass Co., Ltd., average fiber diameter: 13 μm, average fiber length: 3 mm)

Reference Example 7

(D) Alkoxysilane Compound Having One or More Groups Selected Among Epoxy Group, Amino Group, Isocyanate Group, Hydroxyl Group, Mercapto Group and Ureido Group (D-1)

2-(3,4-epoxycyclohexyl)ethyltrimethoxysilane (KBM-303 manufactured by Shin-Etsu Chemical Co., Ltd.)

Reference Example 8

(E) Epoxy Group-Containing Olefin Copolymer (E-1)

Ethylene/glycidyl methacrylate=88/12 (weight ratio) copolymer (BONDFAST BF-E manufactured by Sumitomo Chemical Co., Ltd.)

Reference Example 9

(F) Olefin Copolymer without Containing Epoxy Group (F-1)

Ethylene/1-butene copolymer with MFR=0.5 g/10 minutes (190° C., 2.16 kg weight) and density 0.861 g/cm$^3$ (TAFMER TX-610 manufactured by Mitsui Chemicals, Inc.)

Examples 1 to 4, Comparative Examples 1 to 3

The respective components shown in Table 1 were dry-blended at the rates shown in Table 1, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) and were pelletized with a strand cutter. The conditions of melt-kneading were the screw rotation speed of 300 rpm, the discharge rate of 20 kg/hr, and the cylinder temperature set to control the resin temperature in the die discharge outlet to 300° C. The pellets dried at 130° C. overnight were subject to injection molding and were evaluated for the heating loss $\Delta$Wh, the bar flow length, the tensile properties (tensile strength and tensile elongation), the flexural properties (flexural strength and flexural modulus), the impact property, the deflection temperature under load and the heat sag amount. The results of evaluation are shown in Table 1.

TABLE 1

| | | EX 1 | EX 2 | EX 3 | EX 4 | COMP EX 1 | COMP EX 2 | COMP EX 3 |
|---|---|---|---|---|---|---|---|---|
| (A) Polyphenylene Sulfide Resin with $\Delta$Wr of Greater Than 0.18% | type | A-1 | A-1 | A-1 | A-1 | A-1 | A-1 | A-1 |
| | % by weight | 95 | 90 | 80 | 80 | 100 | 80 | 80 |
| | type | — | — | — | — | — | A-2 | A-3 |
| | % by weight | — | — | — | — | — | 20 | 20 |
| (B) Polyphenylene Sulfide Resin with $\Delta$Wr of Not Greater Than 0.18% | type | B-2 | B-2 | B-2 | B-1 | — | — | — |
| | % by weight | 5 | 10 | 20 | 20 | — | — | — |
| Kneading Method | | m1 | m1 | m1 | m1 | m1 | m1 | m1 |

TABLE 1-continued

|  |  | EX 1 | EX 2 | EX 3 | EX 4 | COMP EX 1 | COMP EX 2 | COMP EX 3 |
|---|---|---|---|---|---|---|---|---|
| Heating Loss ΔWh (320° C. × 2 hr) | % | 0.24 | 0.24 | 0.24 | 0.19 | 0.26 | 0.23 | 0.43 |
| Bar Flow Length (0.5 mm in thickness) | mm | 95 | 98 | 101 | 93 | 93 | 84 | 101 |
| Tensile Strength | MPa | 89 | 84 | 80 | 81 | 79 | 91 | 80 |
| Tensile Elongation | % | 6.0 | 5.2 | 5.4 | 5.6 | 5.8 | 6.6 | 5.3 |
| Flexural Strength | MPa | 139 | 133 | 130 | 131 | 132 | 141 | 135 |
| Flexural Modulus | GPa | 3.79 | 3.78 | 3.80 | 3.81 | 3.68 | 3.60 | 3.65 |
| Notched Izod Impact Strength | J/m | 24 | 20 | 20 | 20 | 18 | 28 | 20 |
| Deflection Temperature under Load (under 0.46 MPa) | ° C. | 220 | 230 | 245 | 205 | 195 | 198 | 181 |
| Heat Sag Amount (190° C. × 15 hr) | mm | 10.0 | 8.9 | 6.0 | 14.0 | 16.5 | 16.1 | 17.5 | m1: kneaded simultaneously

The following describes comparison between the results of above Examples 1 to 4 and the results of above Comparative Examples 1 to 3.

The results show that Examples 1 to 4 obtained by mixing the polyphenylene sulfide resin having ΔWr of not greater than 0.18% (B) with the polyphenylene sulfide resin having ΔWr of greater than 0.18% (A) reduced the outgas amount and improved the heat resistance without deteriorating the intrinsic mechanical properties of the PPS resin, compared with Comparative Example 1 without mixing the component (B). Especially Examples 1 to 3 using (B-2) with the small weight-average molecular weight of the PPS resin had significant reductions of the heat sag amount.

Comparative Examples 2 and 3 obtained by respectively mixing the PPS resin (A-2) and the PPS resin (A-3) having different weight-average molecular weights of the PPS resin instead of the component (B) with the PPS resin (A-1) as the component (A) had the low deflection temperature under load, no substantial reductions of the heat sag amount and no substantial improvement of the heat resistance.

Examples 5 to 9, Comparative Examples 4 to 7

The components (A), (B) and (D) shown in Table 2 or 3 were dry-blended at the rates shown in Table 2 or 3, were melt-kneaded using a twin-screw extruder TEX 30α with a vacuum vent manufactured by the Japan Steel Works, LTD. (L/D=45.5, five kneading sections) and were pelletized with a strand cutter. The above raw materials to be dry-blended were fed from the main feeder of the extruder (at the location of L/D=45.5 from the die head). The component (C) was fed in the middle using the side feeder at the location of L/D=15 from the die head to achieve the rate shown in Table 2 or 3. The conditions of melt-kneading were the screw rotation speed of 300 rpm and the cylinder temperature set to control the resin temperature in the die discharge outlet to be not higher than 330° C. The pellets dried at 130° C. overnight were subject to injection molding and were evaluated for the melt crystallization temperature, the heating loss ΔWh, the bar flow length, the tensile properties, the flexural properties, the impact property, the deflection temperature under load and the surface smoothness. The results of evaluation are shown in Tables 2 and 3.

TABLE 2

|  |  | EX 5 | EX 6 | EX 7 | EX 8 | EX 9 |
|---|---|---|---|---|---|---|
| (A) Polyphenylene Sulfide Resin with ΔWr of Greater Than 0.18% | type | A-1 | A-1 | A-1 | A-1 | A-1 |
|  | % by weight | 50 | 50 | 90 | 90 | 10 |
|  | type | — | — |  |  |  |
|  | % by weight | — | — |  |  |  |
| (B) Polyphenylene Sulfide Resin with ΔWr of Not Greater Than 0.18% | type | B-1 | B-1 | B-1 | B-2 | B-1 |
|  | % by weight | 50 | 50 | 10 | 10 | 90 |
| (C) Fibrous Filler | type | C-1 | C-1 | C-1 | C-1 | C-1 |
|  | parts by weight*[1] | 70 | 70 | 70 | 70 | 70 |
| (D) Alkoxysilane Compound having One Or More Groups Selected Among Epoxy Group, Amino Group, Isocyanate Group, Hydroxyl Group, Mercapto Group and Ureido Group | type | — | D-1 | — | — | — |
|  | parts by weight*[2] | — | 0.5 | — | — | — |
| Kneading Method |  | m2 | m3 | m2 | m2 | m2 |
| Melt Crystallization Temperature Tmc | ° C. | 232 | 230 | 228 | 235 | 240 |
| Heating Loss ΔWh (320° C. × 2 hr) | % | 0.10 | 0.11 | 0.14 | 0.16 | 0.06 |
| Bar Flow Length (0.5 mm in thickness) | mm | 65 | 63 | 62 | 72 | 61 |
| Tensile Strength | MPa | 175 | 182 | 170 | 168 | 183 |
| Tensile Elongation | % | 4.0 | 4.5 | 4.0 | 3.8 | 4.0 |
| Flexural Strength | MPa | 231 | 237 | 225 | 223 | 230 |
| Flexural Modulus | GPa | 12.60 | 12.69 | 12.50 | 12.35 | 12.70 |
| Notched Izod Impact Strength | J/m | 92 | 95 | 90 | 89 | 93 |
| Deflection Temperature under Load (under 1.82 MPa) | ° C. | 267 | 268 | 263 | 270 | 272 |
| Center Line Waviness Ra (without Treatment) | μm | 0.30 | 0.20 | 1.05 | 0.78 | 0.08 |
| Center Line Waviness Ra (Heat Treatment at 180° C. × 15 hr) | μm | 0.30 | 0.24 | 1.25 | 1.00 | 0.15 |
| Arithmetic Mean Waviness Wa (without Treatment) | μm | 1.35 | 1.36 | 1.43 | 1.10 | 1.28 |
| Arithmetic Mean Waviness Wa (Heat Treatment at 180° C. × 15 hr) | μm | 2.03 | 2.04 | 2.15 | 1.65 | 1.92 |

*[1] The amount added relative to 100 parts by weight of the resin composition including components (A) and (B)
*[2] The amount added relative to 100 parts by weight of the resin composition including components (A), (B) and (C)
m2: fed (A) and (B) from main feeder and (C) from side feeder
m3: fed (A), (B) and (D) from main feeder and (C) from side feeder

TABLE 3

|  |  | COMP EX 4 | COMP EX 5 | COMP EX 6 | COMP EX 7 |
|---|---|---|---|---|---|
| (A) Polyphenylene Sulfide Resin with ΔWr of Greater Than 0.18% | type | A-1 | A-1 | A-1 | — |
|  | % by weight | 100 | 100 | 90 | — |
|  | type | — | — | A-3 | — |
|  | % by weight | — | — | 10 | — |
| (B) Polyphenylene Sulfide Resin with ΔWr of Not Greater Than 0.18% | type | — | — | — | B-1 |
|  | % by weight | — | — | — | 100 |
| (C) Fibrous Filler | type | C-1 | C-1 | C-1 | C-1 |
|  | parts by weight*[1] | 70 | 70 | 70 | 70 |
| (D) Alkoxysilane Compound having One Or More Groups Selected Among Epoxy Group, Amino Group, Isocyanate Group, Hydroxyl Group, Mercapto Group and Ureido Group | type | — | D-1 | — | — |
|  | parts by weight*[2] | — | 0.5 | — | — |
| Kneading Method |  | m4 | m5 | m4 | m6 |
| Melt Crystallization Temperature Tmc | ° C. | 219 | 217 | 220 | 240 |
| Heating Loss ΔWh (320° C. × 2 hr) | % | 0.17 | 0.19 | 0.23 | 0.03 |
| Bar Flow Length (0.5 mm in thickness) | mm | 62 | 56 | 71 | 58 |
| Tensile Strength | MPa | 163 | 166 | 170 | 140 |
| Tensile Elongation | % | 3.9 | 3.9 | 4.2 | 3.1 |
| Flexural Strength | MPa | 221 | 221 | 230 | 198 |
| Flexural Modulus | GPa | 12.29 | 12.31 | 12.30 | 12.90 |
| Notched Izod Impact Strength | J/m | 89 | 89 | 92 | 59 |
| Deflection Temperature under Load (under 1.82 MPa) | ° C. | 261 | 260 | 252 | 275 |
| Center Line Waviness Ra (without Treatment) | μm | 1.35 | 0.80 | 1.40 | 1.20 |
| Center Line Waviness Ra (Heat Treatment at 180° C. × 15 hr) | μm | 3.20 | 1.52 | 3.10 | 1.80 |
| Arithmetic Mean Waviness Wa (without Treatment) | μm | 1.50 | 1.48 | 1.80 | 1.35 |
| Arithmetic Mean Waviness Wa (Heat Treatment at 180° C. × 15 hr) | μm | 3.75 | 3.73 | 4.50 | 3.05 |

*[1] The amount added relative to 100 parts by weight of the resin composition including components (A) and (B)
*[2] The amount added relative to 100 parts by weight of the resin composition including components (A), (B) and (C)
m4: fed (A) from main feeder and (C) from side feeder
m5: fed (A) and (D) from main feeder and (C) from side feeder
m6: fed (B) from main feeder and (C) from side feeder The following describes comparison between the results of above Examples 5 to 9 and the results of above Comparative Examples 4 to 7.

The results show that Example 5, Example 7 and Example 9 obtained by mixing the component (A), the component (B) and the component (C) had significant reductions of the outgas amount and remarkable improvement of the surface smoothness without deteriorating the excellent mechanical properties and heat resistance, compared with Comparative Example 4 obtained by mixing only the component (A) and the component (C) without mixing the component (B) and Comparative Example 7 obtained by mixing only the component (B) and the component (C) without mixing the component (A). The results also show that Example 6 obtained by further mixing the component (D) in addition to the component (A), the component (B) and the component (C) had the better mechanical properties and heat resistance and significant improvement of the surface smoothness, compared with Comparative Example 5 obtained by mixing the component (A), the component (C) and the component (D) without mixing the component (B). The results further show that Comparative Example 6 having the same composition as that of Example 8 except replacement of the component (B-2) with the component (A-3) of the equivalent molecular weight had significantly worse heat resistance and surface smoothness, compared with Example 8.

Examples 10 to 16, Comparative Examples 8 to 11

The respective components shown in Table 4 or 5 were dry-blended at the rates shown in Table 4 or 5, were melt-kneaded using a twin-screw extruder TEX 30α with a vacuum vent manufactured by the Japan Steel Works, LTD. (screw diameter: 30 mm, L/D=45, five kneading sections, fully intermeshing-type screws rotating in the same direction) and were pelletized with a strand cutter. The conditions of melt-kneading were the screw rotation speed of 300 rpm, the discharge rate of 20 kg/hr, and the cylinder temperature set to control the resin temperature in the die discharge outlet to 300° C. The pellets dried at 130° C. overnight were subject to injection molding and were then measured for the melt crystallization temperature, the heating loss ΔWh, the bar flow length, the tensile elongation, the flexural modulus, the impact property, evaluation for the appearance of the molded product, evaluation for the mold deposit and the number-average dispersed particle diameter of the olefin copolymer. The results of measurement are shown in Tables 4 and 5.

TABLE 4

|  |  | EX 10 | EX 11 | EX 12 | EX 13 | EX 14 | EX 15 | EX 16 |
|---|---|---|---|---|---|---|---|---|
| (A) Polyphenylene Sulfide Resin with ΔWr of Greater Than 0.18% | type | A-1 | A-1 | A-1 | A-1 | A-1 | A-1 | A-3 |
|  | % by weight | 50 | 50 | 90 | 90 | 80 | 10 | 10 |
|  | type | — | — | — | — | — | — | — |
|  | % by weight | — | — | — | — | — | — | — |
| (B) Polyphenylene Sulfide Resin with ΔWr of Not Greater Than 0.18% | type | B-1 | B-1 | B-1 | B-2 | B-2 | B-1 | B-1 |
|  | % by weight | 50 | 50 | 10 | 10 | 20 | 90 | 90 |
| (E) Functional Group-Containing Olefin Copolymer | type | E-1 | E-1 | E-1 | E-1 | E-1 | E-1 | E-1 |
|  | parts by weight*[1] | 20 | 10 | 20 | 20 | 20 | 20 | 20 |
| (F) Olefin Copolymer Without Containing | type | — | F-1 | — | — | — | — | — |

TABLE 4-continued

|  |  | EX 10 | EX 11 | EX 12 | EX 13 | EX 14 | EX 15 | EX 16 |
|---|---|---|---|---|---|---|---|---|
| Functional Group | parts by weight*[2] | — | 10 | — | — | — | — | — |
| Kneading Method |  | m1 | m1 | m1 | m1 | m1 | m1 | m1 |
| Number-Average Dispersed Particle Diameter of Olefin Copolymer | nm | 300 | 350 | 310 | 305 | 450 | 800 | 800 |
| Melt Crystallization Temperature Tmc | °C. | 235 | 233 | 227 | 229 | 236 | 240 | 238 |
| Heating Loss ΔWh (320° C. × 2 hr) | % | 0.17 | 0.15 | 0.28 | 0.32 | 0.32 | 0.16 | 0.25 |
| Bar Flow Length (0.5 mm in thickness) | mm | 65 | 70 | 59 | 60 | 69 | 63 | 70 |
| Tensile Elongation | % | 30 | 40 | 30 | 25 | 22 | 18 | 22 |
| Flexural Modulus | MPa | 2600 | 2300 | 2000 | 2300 | 2600 | 2550 | 2500 |
| Notched Izod Impact Strength (room temp) | J/m | 545 | 610 | 520 | 515 | 500 | 300 | 310 |
| Notched Izod Impact Strength (−20° C.) | J/m | 320 | 380 | 300 | 290 | 200 | 120 | 130 |
| Arithmetic Mean Waviness Wo (without Treatment) | μm | 0.65 | 0.66 | 1.20 | 0.99 | 0.85 | 0.45 | 0.41 |
| Arithmetic Mean Waviness Wo (Heat Treatment at 180° C. × 15 hr) | μm | 0.80 | 0.82 | 1.30 | 1.10 | 1.25 | 0.62 | 0.59 |
| Evaluation of Mold Deposit | ○, Δ, X | ○ | ○ | Δ~○ | Δ | Δ | ○ | ○ |

*[1]The amount added relative to 100 parts by weight of the resin composition including components (A) and (B)
*[2]The amount added relative to 100 parts by weight of the resin composition including components (A), (B) and (E)
m1: kneaded simultaneously

TABLE 5

|  |  | COMP EX 8 | COMP EX 9 | COMP EX 10 | COMP EX 11 |
|---|---|---|---|---|---|
| (A) Polyphenylene Sulfide Resin with ΔWr of Greater Than 0.18% | type | A-1 | — | A-1 | A-1 |
|  | % by weight | 100 | — | 100 | 90 |
|  | type | — | — | — | A-3 |
|  | % by weight | — | — | — | 10 |
| (B) Polyphenylene Sulfide Resin with ΔWr of Not Greater Than 0.18% | type | — | B-1 | — | — |
|  | % by weight | — | 100 | — | — |
| (E) Functional Group-Containing Olefin Copolymer | type | E-1 | E-1 | E-1 | E-1 |
|  | parts by weight*[1] | 20 | 20 | 10 | 20 |
| (F) Olefin Copolymer Without Containing Functional Group | type | — | — | F-1 | — |
|  | parts by weight*[2] | — | — | 10 | — |
| Kneading Method |  | m1 | m1 | m1 | m1 |
| Number-Average Dispersed Particle Diameter of Olefin Copolymer | nm | 300 | 1000 | 355 | 270 |
| Melt Crystallization Temperature Tmc | °C. | 217 | 240 | 217 | 215 |
| Heating Loss ΔWh (320° C. × 2 hr) | % | 0.33 | 0.14 | 0.36 | 0.41 |
| Bar Flow Length (0.5 mm in thickness) | mm | 57 | 65 | 60 | 60 |
| Tensile Elongation | % | 30 | 12 | 40 | 35 |
| Flexural Modulus | MPa | 1800 | 2850 | 1600 | 1750 |
| Notched Izod Impact Strength (room temp) | J/m | 550 | 250 | 605 | 570 |
| Notched Izod Impact Strength (−20° C.) | J/m | 315 | 80 | 380 | 350 |
| Arithmetic Mean Waviness Wa (without Treatment) | μm | 1.50 | 0.40 | 1.52 | 1.40 |
| Arithmetic Mean Waviness Wa (Heat Treatment at 180° C. × 15 hr) | μm | 3.30 | 0.60 | 3.25 | 3.10 |
| Evaluation of Mold Deposit | ○, Δ, X | X~Δ | ○ | X | X |

*[1]The amount added relative to 100 parts by weight of the resin composition including components (A) and (B)
*[2]The amount added relative to 100 parts by weight of the resin composition including components (A), (B) and (E)
m1: kneaded simultaneously The following describes comparison between the results of above Examples 10 to 16 and the results of above Comparative Examples 8 to 11.

The results show that Example 10 obtained by mixing the component (A), the component (B) and the component (E) had improvement in rigidity and mold deposit without deteriorating the high toughness and allowed for acceleration of cooling and solidification of the molten resin in the mold, so as to provide the better mold transfer property and the extremely good appearance of the molded product, compared with Comparative Example 8 obtained by mixing the component (A) and the component (C) without mixing the component (B). The results also show that Comparative Example 9 differing from Example 10 by the absence of the component (A) had improvement in mold deposit and rigidity but had increase in number-average dispersed particle diameter, reduction of the compatibility with the component (E) and significant deterioration of the toughness, compared with Example 10.

The results further show that Examples 12, 15 and 16 differing from Example 10 by adequately changing the molecular weights and the added amounts of the component (A) and the component (B) had increased rigidity and improvement in appearance without substantially deteriorating the toughness, compared with Comparative Example 8 obtained by mixing the component (A) and the component (C) without mixing the component (B). The result also show that Example 11 obtained by further mixing the component (F) in addition to Example 10 had improvement in rigidity and less mold deposit without maintaining the excellent toughness at low temperature, compared with Comparative Example 10 obtained by excluding the component (B) from Example 11.

The results also show that Example 13 had significant reduction of the outgas amount, improvement in mold deposit and rigidity and the better appearance of the molded product, compared with Comparative Example 11. Example 13 is a resin composition obtained by replacing the PPS resin (B-1) with the PPS resin (B-2) of the lower molecular weight as the component (B), while Example 10 contains the PPS resin (B-1) as the component (B). Comparative Example 11 has the same composition as that of Example 13 except replacement of the PPS resin (B-2) contained in Example 13 with the PPS resin component (A-3) of the same molecular weight as that of the PPS resin (B-2).

The invention claimed is:

1. A production method of a polyphenylene sulfide resin composition, comprising the steps of:
providing a component (A) which is a polyphenylene sulfide resin having a weight loss percentage ΔWr expressed by Equation (1) of greater than 0.18% under heating:

$$\Delta Wr=(W1-W2)/W1\times 100\% \qquad (1)$$

wherein ΔWr denotes weight loss percentage (%) and is a value determined from a sample in thermogravimetric analysis at a temperature rise rate of 20° C. per minute under ordinary-pressure and non-oxidizing atmosphere, ΔWr is determined from a sample weight (W1) at 100° C. and a sample weight (W2) at 330° C.;
providing a component (B) which is a polyphenylene sulfide resin having a weight-average molecular weight of not less than 10,000 and having the weight loss percentage ΔWr expressed by the Equation (1) of not greater than 0.18% under heating; and
melt kneading 5 to 95% by weight of the component (B) with 95 to 5% by weight of the component (A), wherein the total of the component (A) and the component (B) is equal to 100% by weight.

2. The production method of a polyphenylene sulfide resin composition according to claim 1, wherein the polyphenylene sulfide resin that is the component (B) has a degree of dispersion of not greater than 2.5, wherein the degree of dispersion is provided by dividing the weight-average molecular weight by the number-average molecular weight.

3. The production method of a polyphenylene sulfide resin composition according to claim 1, wherein the component (B) has an alkali metal content of less than 700 ppm based on the total weight of the component (B).

4. The production method of a polyphenylene sulfide resin composition according to claim 1, wherein a content of a total amount of a lactone-based compound in a gas component produced by heating the component (B) which is provided in the step of providing the component (B) at 320° C. under nitrogen stream for 60 minutes is not greater than 500 ppm on a weight basis of polyphenylene sulfide.

5. The production method of a polyphenylene sulfide resin composition according to claim 1, wherein a content of a total amount of an aniline-based compound in a gas component produced by heating the component (B) which is provided in the step of providing the component (B) at 320° C. under nitrogen stream for 60 minutes is not greater than 300 ppm on a weight basis of polyphenylene sulfide resin.

6. The production method of a polyphenylene sulfide resin composition according to claim 1, wherein the component (B) is a polyphenylene sulfide resin obtained by heating a polyphenylene sulfide prepolymer to be converted to a high degree of polymer, wherein the polyphenylene sulfide prepolymer includes at least 50% by weight of a cyclic polyphenylene sulfide shown by a formula (I):

wherein m is an integral number of 4 to 20, and the cyclic polyphenylene sulfide is either a single component having a single repeating number or a mixture having different repeating numbers.

* * * * *